(12) United States Patent
Nemoto et al.

(10) Patent No.: US 8,085,420 B2
(45) Date of Patent: Dec. 27, 2011

(54) IMAGE PROCESSING APPARATUS WITH HOT FOLDER FUNCTIONALITY

(75) Inventors: Junko Nemoto, Tokyo (JP); Yoshio Kimura, Tokyo (JP)

(73) Assignee: Canon Kabushiki Kaisha (JP)

( * ) Notice: Subject to any disclaimer, the term of this patent is extended or adjusted under 35 U.S.C. 154(b) by 1010 days.

(21) Appl. No.: 12/013,159

(22) Filed: Jan. 11, 2008

(65) Prior Publication Data

US 2008/0174817 A1      Jul. 24, 2008

(30) Foreign Application Priority Data

Jan. 23, 2007  (JP) ................................. 2007-012960

(51) Int. Cl.
*G06F 3/12* (2006.01)
(52) U.S. Cl. ........................ 358/1.15; 358/1.1; 358/1.16
(58) Field of Classification Search ................... 358/1.1, 358/1.9, 1.15, 1.16, 448
See application file for complete search history.

(56) References Cited

U.S. PATENT DOCUMENTS

| | | | | |
|---|---|---|---|---|
| 7,580,943 | B2 * | 8/2009 | Sakura et al. ........................ | 1/1 |
| 2004/0012812 | A1 | 1/2004 | Shimizu | |
| 2005/0246631 | A1 | 11/2005 | Mori et al. | |
| 2006/0026121 | A1 | 2/2006 | Terao | |
| 2006/0171002 | A1 * | 8/2006 | Mori ............................. | 358/538 |
| 2006/0187479 | A1 | 8/2006 | Kikuchi | |
| 2006/0256360 | A1 | 11/2006 | Kayama | |
| 2006/0279780 | A1 | 12/2006 | Anno et al. | |
| 2007/0005561 | A1 | 1/2007 | Sakura et al. | |

FOREIGN PATENT DOCUMENTS

| | | |
|---|---|---|
| EP | 1587002 A | 10/2005 |
| EP | 1710686 A | 10/2006 |
| JP | 2000-118095 A | 4/2000 |
| JP | 2000-222100 A | 8/2000 |
| JP | 2002135602 A | 5/2002 |
| JP | 2004-287859 A | 10/2004 |
| JP | 2004-287860 A | 10/2004 |
| JP | 2005-115660 A | 4/2005 |
| JP | 2005-242661 A | 9/2005 |
| KR | 10-2003-0084791 A | 11/2003 |

OTHER PUBLICATIONS

Search Report issued in corresponding European patent application No. 08100847.6, dated May 27, 2008.
Office Action issued in corresponding Korean Patent Application No. 10-2008-0007135 dated Sep. 29, 2009.
Office Action issued in corresponding Japanese patent application No. JP2007-012960, dated Nov. 7, 2011.

* cited by examiner

*Primary Examiner* — Thomas D Lee
(74) *Attorney, Agent, or Firm* — Rossi, Kimms & McDowell LLP

(57) ABSTRACT

When a user logs in and inputs document data into a box, a usage history of the box as used by the user is determined by referring to a user information management table. If there is a record, process attributes are set, and a process associated with the box is executed. If there is no record, a message indicating that there is no record is displayed. If execution is selected in response to this display, the process is executed. Once the process has ended, the usage record of the box as used by the user is updated to "used".

6 Claims, 21 Drawing Sheets

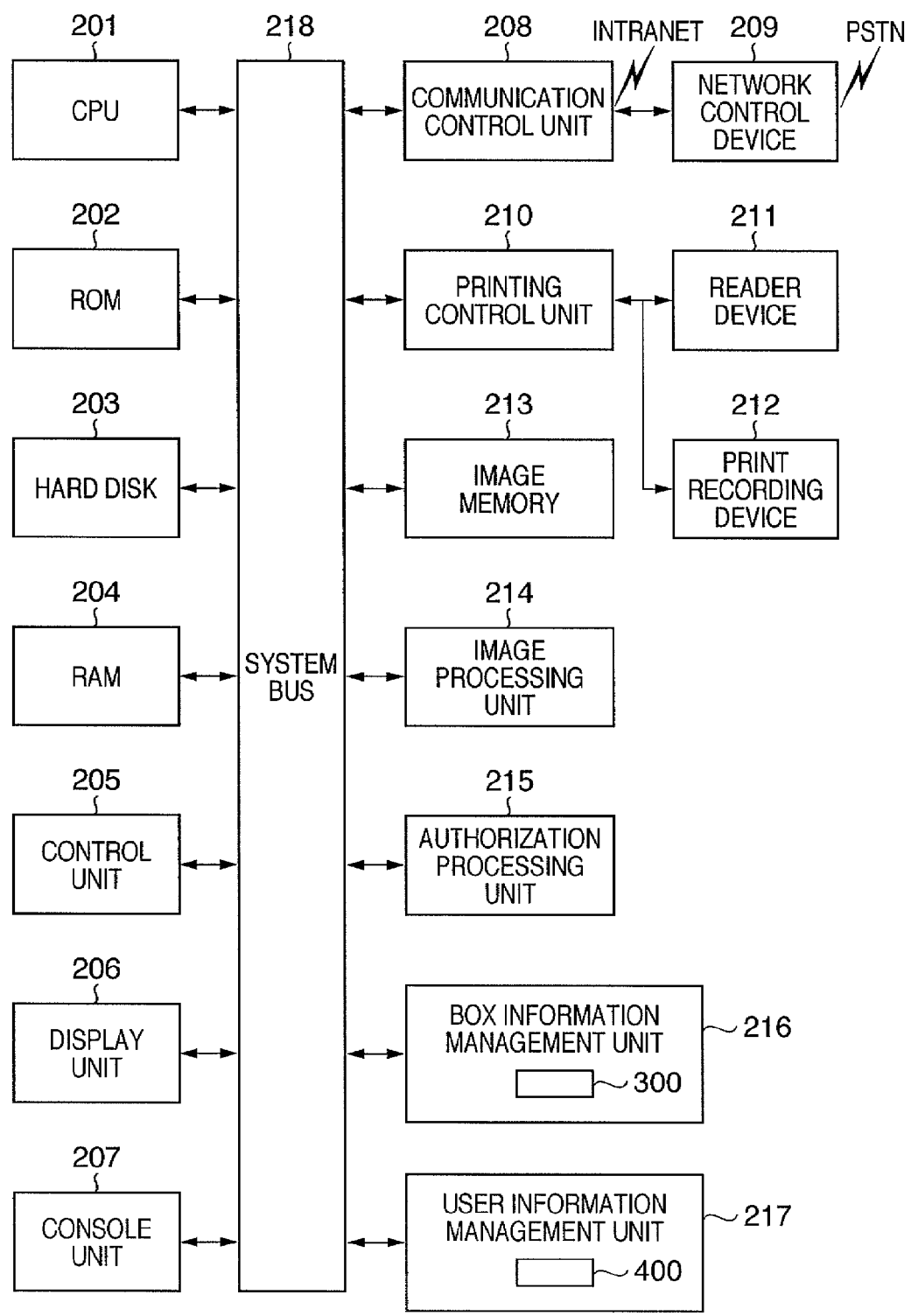

| BOX NUMBER | NAME | ATTRIBUTE ||||
|---|---|---|---|---|---|
| | | HOT FOLDER | TRIGGER | PROCESS PARAMETER | PROCESS ATTRIBUTES | UPDATE INFORMATION |
| 00 | SECTION BOX | SET | ENTRY | PRINT | A4 | 2006/5/1 |
| | | | | | BOOK (SADDLE STITCH) | |
| | | | | | GRAYSCALE PRINT | |
| 01 | APPROVAL BOX | UNSET | — | — | — | — |
| 02 | | SET | USER 1 LOGIN | EDIT | LINK DOCUMENT (DOCUMENT 1) | 2006/4/1 |
| | | | | SEND | E-Mail (SECT. HEAD) | |
| | | | | EDIT | DELETE (LINKED DOCUMENT) | |
| 03 | 2in1 COPY | SET | ENTRY | PRINT | 2in1 | 2004/7/1 |
| 04 | REGULAR MEETING RECORD | SET | | SEND | E-Mail (COMPANY X) | |
| | | | | SEND | E-Mail (COMPANY Y) | |
| | | | | SEND | E-Mail (COMPANY Z) | |
| | | | | SEND | E-Mail (DEPARTMENT HEAD) | |
| | | | | PRINT | BOOK PRINT | |
| | | | | BACKUP | | |
| 05 | ×× | SET | ENTRY | REQUEST | | |

FIG. 4

| USER NAME | SECTION | HOT FOLDER PROCESS EXECUTION INFORMATION | | | | |
|---|---|---|---|---|---|---|
| | | BOX 1 | BOX 2 | BOX 3 | BOX 4 | .. |
| USER A | SALES DIV. 1 | TRUE | FALSE | TRUE | TRUE | .. |
| USER B | SALES DIV. 1 | TRUE | FALSE | FALSE | TRUE | .. |
| USER C | MARKETING | FALSE | FALSE | TRUE | FALSE | .. |
| USER D | GENERAL | FALSE | FALSE | TRUE | FALSE | .. |
| .. | .. | .. | .. | .. | .. | |

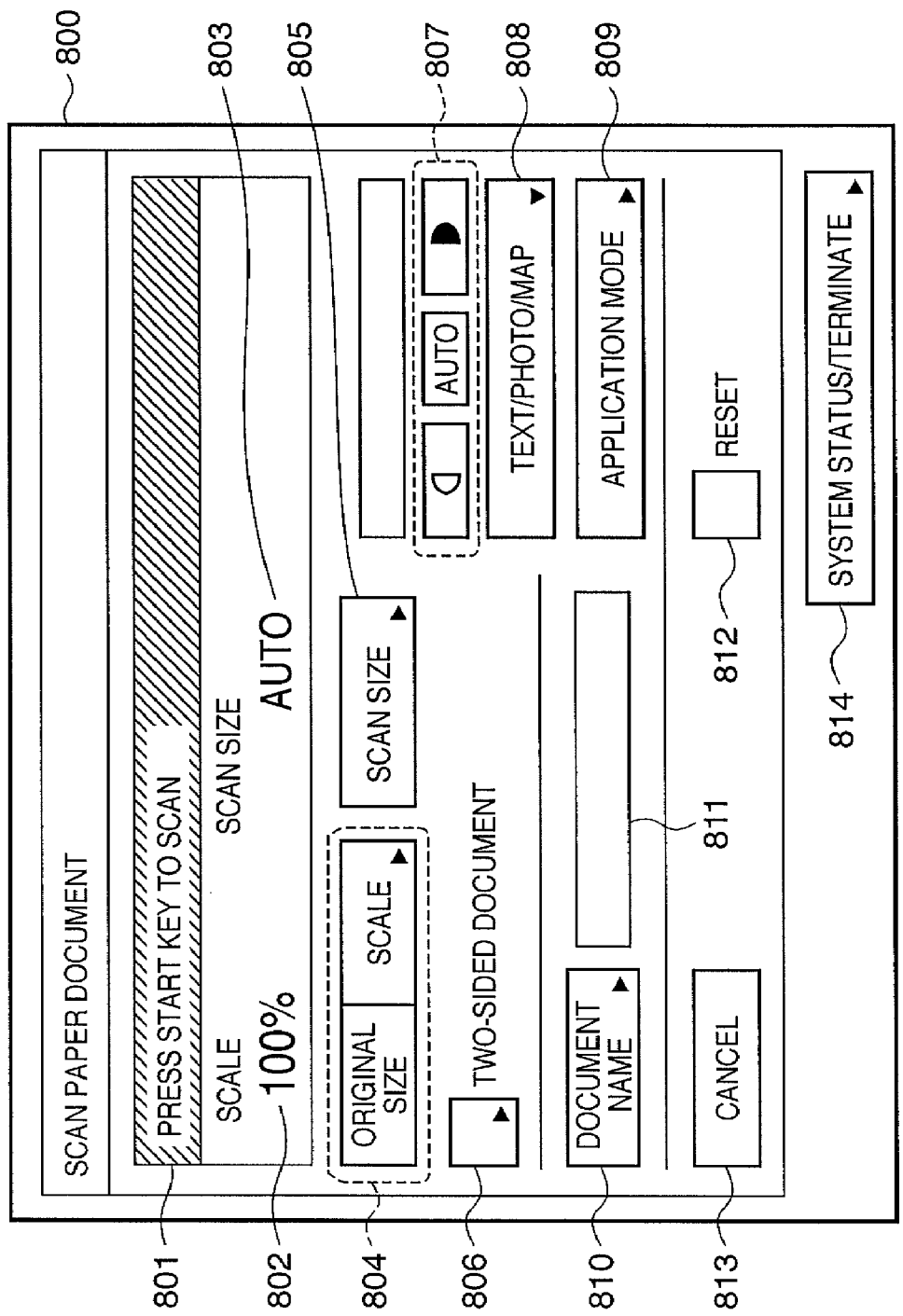

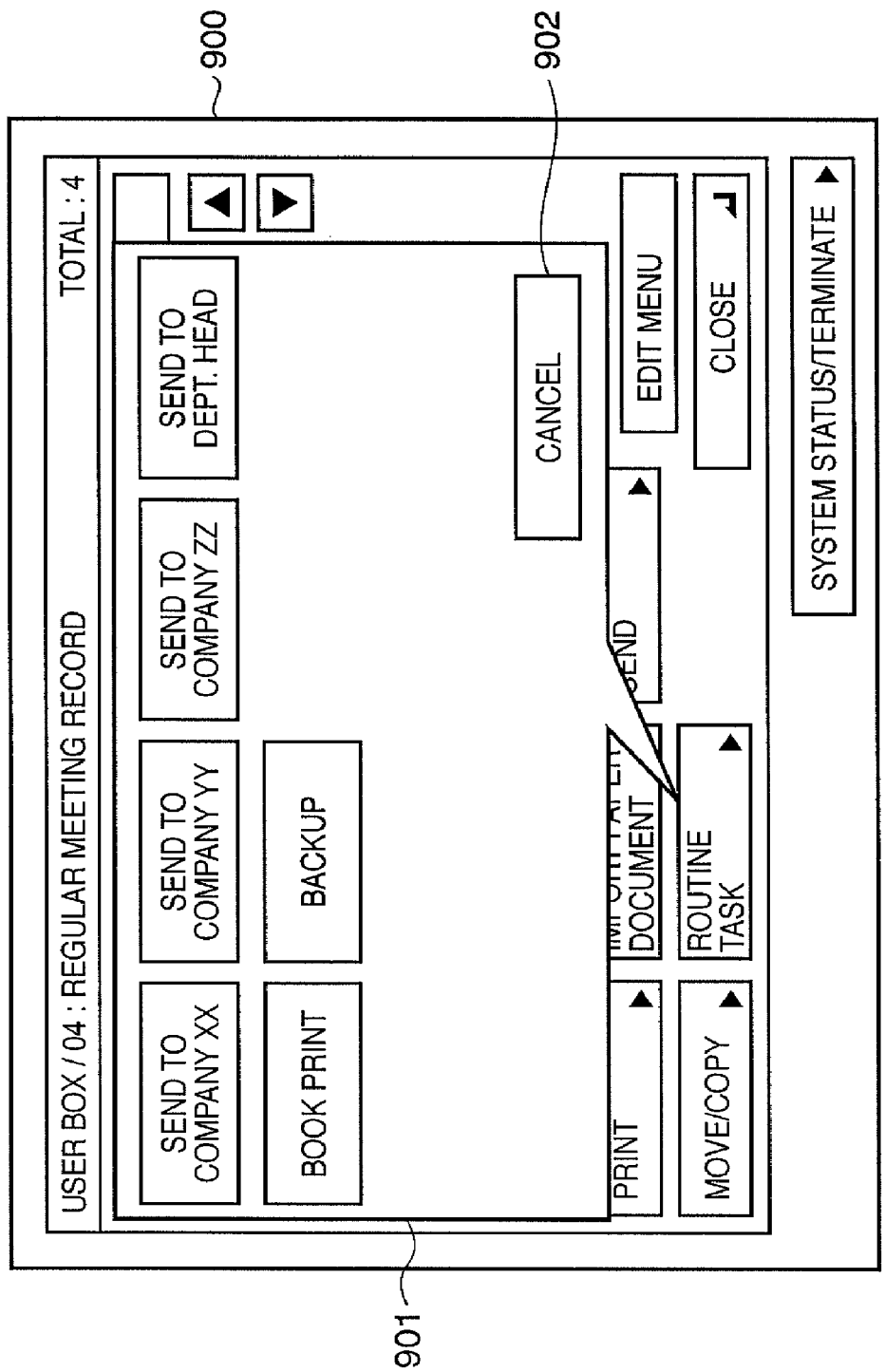

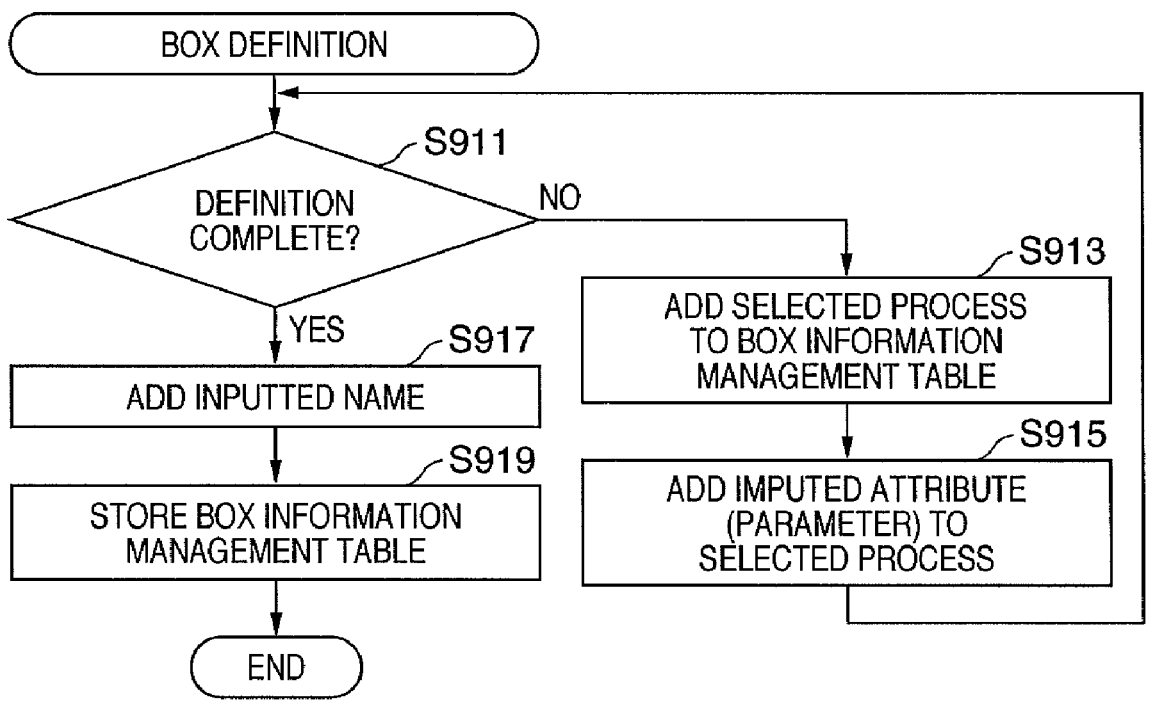
F I G. 9B

FIG. 17

| USER NAME | SECTION | HOT FOLDER PROCESS EXECUTION INFORMATION | | | | |
|---|---|---|---|---|---|---|
| | | BOX 1 | BOX 2 | BOX 3 | BOX 4 | .. |
| USER A | SALES DIV. 1 | 2006/6/10 | — | 2006/7/19 | 2006/5/20 | .. |
| USER B | SALES DIV. 1 | 2006/5/20 | — | — | 2006/5/20 | .. |
| USER C | MARKETING | — | — | 2006/4/2 | — | .. |
| USER D | GENERAL | — | — | 2006/5/22 | 2004/3/25 | .. |
| .. | .. | .. | .. | .. | .. | .. |

| BOX NUMBER | NAME | ATTRIBUTE | | | |
|---|---|---|---|---|---|
| | | HOT FOLDER | PROCESS PARAMETER | PROCESS ATTRIBUTES | UPDATE INFORMATION |
| 01 | SECTION BOX | SET | PRINT | A4 | Ver.5 |
| | | | | BOOK (SADDLE STITCH) | |
| | | | | GRAYSCALE PRINT | |
| 02 | | UNSET | — | — | — |
| 03 | APPROVAL BOX | SET | EDIT | LINK DOCUMENT (DOCUMENT 1) | Ver.12 |
| | | | SEND | E-Mail (SECT. HEAD) | |
| | | | EDIT | DELETE (LINKED DOCUMENT) | |
| 04 | 2in1 COPY | SET | PRINT | 2in1 | Ver.1 |
| .. | .. | .. | .. | .. | .. |

FIG. 19

| USER NAME | SECTION | HOT FOLDER PROCESS EXECUTION INFORMATION | | | | |
|---|---|---|---|---|---|---|
| | | BOX 1 | BOX 2 | BOX 3 | BOX 4 | .. |
| USER A | SALES DIV. 1 | Ver.5 | — | Ver.12 | Ver.1 | .. |
| USER B | SALES DIV. 1 | Ver.5 | — | Ver.8 | Ver.1 | .. |
| USER C | MARKETING | Ver.4 | — | Ver.12 | — | .. |
| USER D | GENERAL | — | — | — | — | .. |
| .. | .. | .. | .. | .. | .. | .. |

1900

F I G. 20

| BOX NUMBER | NAME | ATTRIBUTE ||||
| --- | --- | --- | --- | --- | --- |
| | | HOT FOLDER | DEFINED FILE | STORAGE LOCATION | UPDATE INFORMATION |
| 01 | SECTION BOX | SET | box01 | application¥box¥01 | 2006/5/1 |
| 02 | APPROVAL BOX | UNSET | — | — | — |
| 03 | 2in1 COPY | SET | box03 | application¥box¥03 | 2006/4/1 |
| 04 | .. | SET | copy_2in1 | application¥box | 2004/7/1 |
| .. | .. | .. | .. | .. | .. |

2000

IMAGE PROCESSING APPARATUS WITH HOT FOLDER FUNCTIONALITY

BACKGROUND OF THE INVENTION

1. Field of the Invention

The present invention relates to an image processing apparatus, digital multifunction apparatus and control method thereof that automatically execute processing on, for example, image data.

2. Description of the Related Art

Some image processing apparatuses, such as digital multifunction apparatuses or digital copy machines that include scanners, facsimiles, printers, and so on, are provided with storage units for storing documents. Such apparatuses include functionality for storing documents ("box" functionality) inputted using a variety of methods, such as through a scanner or by receiving the documents from a client computer connected to a network. The storage location of the documents is referred to as a "box". Documents stored in the box are used by applications in the digital multifunction apparatus, either as-is or after being edited. For example, the document may be transferred to another box as-is, or a plurality of documents may be bound and printed after being linked together; further still, the document may be compressed and sent out as an e-mail. Processes such as these include combinations of plural functions, processes that require specific settings, and so on.

Accordingly, the implementation of "hot folders" in boxes is currently being investigated. "Hot folder" refers to a function in an information processing apparatus such as a personal computer that allows a document to be printed automatically simply by storing the document in a specific folder, the printing being carried out based on printing attributes registered as folder attributes in advance (for example, see Japanese Patent Laid-Open No. 2005-115660 (Patent Document 1) and Japanese Patent Laid-Open No. 2005-242661 (Patent Document 2)). In other words, by implementing hot folders in boxes, a document can be registered as a job as soon as that document enters the box, based on printing attributes that have been registered as box attributes for that box (for example, see Japanese Patent Laid-Open No. 2000-118095 (Patent Document 3)).

Furthermore, other functions of the multifunction apparatus, such as sending image data via e-mail, copying/transferring the document, and so on, can be executed by registering other processes aside from printing as box attributes. A box can also be reused as a routine task box by registering a combination of plural processes, a processing rule that defines a series of processes, or the like as the box attribute. When utilizing a box in this manner, detailed settings for each of the processes need not be carried out each time the box is used, which leads to a reduction in operational mistakes and also cuts back on the amount of time required for operation.

A function for commencing a pre-set series of processes by depressing a predetermined key on the console of a multifunction apparatus has heretofore been utilized (for example, see Japanese Patent Laid-Open No. 2000-222100 (Patent Document 4). However, a user is required to perform an action such as depressing a key on the console of the multifunction apparatus in order to make use of this function. This function therefore cannot be utilized for items sent via a network from drivers, applications, or the like within a client computer. The function being described presently differs from the implementation of hot folders in this respect. For example, when plural users perform the same task, an administrator or the like sets up a hot folder in a specific box for a specific user, and the user performs his/her task by inserting a document in that box. This makes it possible to reduce differences in operational procedures and processing speeds among users. When process procedures are changed, the administrator may simply change the settings, as long as these settings are of a scope to which changes in the box attributes can comply; hence the user need not be aware of the changes. Furthermore, when limited processes, the execution of which is allowed only for certain users, have arisen, simple function limitations can be implemented by limiting access to a box for which limited processing has been set as a box attribute.

Finally, a service processing apparatus has also been proposed, whereby instructions that follow a job flow defined by a user are created and stored, and processing is executed according to the job flow written in the instructions upon those instructions being selected by a user (see Japanese Patent Laid-Open No. 2004-287859 (Patent Document 5) and Japanese Patent Laid-Open No. 2004-287860 (Patent Document 6)).

As discussed thus far, in order to process image data as per the instructions of a user, it has been necessary, in conventional digital multifunction apparatuses, to create key operation sequences, job flows, and so on in advance. It has also been necessary for the user to specify which processing sequence to execute within the digital multifunction apparatus itself.

Moreover, even if processing sequences are defined in advance, there is still the possibility that a process not intended to be executed by the user is nevertheless executed should the user specify the wrong sequence. Another problem lies in that regularly-used sequences can easily be utilized without paying attention to the parameters of the settings, and thus the actual process executed, the actual output, and so on may differ from the intended process, output, and so on. In particular, if a malicious user has performed settings for, for example, sending image data to the exterior, not only do information leaks occur, but other users may not notice this immediately, leading to a delayed response time.

SUMMARY OF THE INVENTION

Having been conceived in order to solve the aforementioned problems, it is an object of the present invention to provide a digital multifunction apparatus and control method thereof that implements hot folders, utilizing various functions as box functions of the multifunction apparatus.

It is a further object of the present invention to provide an image processing apparatus and control method thereof capable of preventing the execution of unintended processes due to operational mistakes and information leaks without reducing the usability afforded by the implementation of hot folder in the box.

In order to realize the abovementioned object, the present invention is configured as follows. In other words, the present invention is an image processing apparatus provided with a hot folder function that associates a box with a process to be performed on data inputted into the box, and comprises: a storage means for storing a box management table that stores definitions of processes for data inputted into the box, and a user management table in which usage histories of boxes are recorded and stored per user and per box; a processing means that, in the case where data has been inputted into a box by a user, refers to the user management table and determines whether or not there is a record of the user inputting data into the box, executes the process associated with the box on the inputted data if there is a record, or outputs a message indicating there is no record if there is no record and accepts a confirmatory input from the user, and executes the process associated with the box on the inputted data and records the usage history of the box by the user in the user management table in the case where the confirmatory input has been accepted from the user; and a process parameter maintenance means that deletes the usage history of the box from the user management table in the case where the process defined in the box management table has been changed in response to an operation performed by the user.

Another aspect of the present invention is configured as follows. In other words, another aspect of the present invention is a digital multifunction apparatus provided with a hot folder function that associates a box with a process to be performed on data inputted into the box, and comprises: an image scanner unit; a storage means for storing a box management table that stores definitions of processes for data inputted into the box; and a processing means that, in the case where image data scanned by the image scanner has been inputted into the box, refers to the box management table and executes the process associated with the box.

Still another aspect of the present invention is configured as follows. In other words, still another aspect of the present invention is a control method for controlling an image processing apparatus having a storage and a processor, and provided with a hot folder function that associates a box that accepts data with a process to be performed on data inputted into the box, the method comprising the steps of:

determining, in the case where data has been inputted into a box by a user, whether or not there is a record of the user inputting data into the box, by referring to a user management table, stored in the storage means, in which usage histories of boxes are registered and stored per user and per box;

outputting a message indicating there is no record if there is no record, and accepting a confirmatory input from the user;

executing the process associated with the box on the inputted data and registering the usage history of the box by the user in the user management table, by referring to the box management table, stored in the storage means, that stores definitions of processes to be performed on data inputted into the box;

referring to the box management table in the case where there is a record and performing the process associated with the box on the inputted data; and deleting the usage history of the box from the user management table in the case where the process defined in the box management table has been changed in response to an operation performed by the user.

Yet another aspect of the present invention is configured as follows. In other words, yet another aspect of the present invention is a control method for controlling a digital multifunction apparatus provided with a hot folder function that associates a box that accepts data with a process to be performed on data inputted into the box, and also provided with a scanner unit, the method comprising the steps of:

in the case where image data scanned by the scanner has been inputted into the box, referring to a box management table that stores definitions of processes to be performed on the data inputted into the box; and executing the process defined in the box management table on the data inputted into the box.

According to the present invention, a hot folder function can be added to the box function of a copy machine. Furthermore, the present invention can prevent the execution of processes contrary to a user's intentions, information leaks, and so on without reducing the usability afforded by a box in which hot folders have been implemented.

Further features of the present invention will become apparent from the following description of exemplary embodiments (with reference to the attached drawings).

BRIEF DESCRIPTION OF THE DRAWINGS

FIG. 2 is a block diagram illustrating a general configuration of a multifunction apparatus 102.

FIG. 3 is a diagram illustrating an example of a box information management table according to a first embodiment of the present invention.

FIG. 4 is a diagram illustrating an example of a user information management table according to the first embodiment of the present invention.

FIG. 8 is a diagram illustrating an example of a paper document scanning screen displayed in the display unit 206.

FIG. 9A is a diagram illustrating an example of a routine task display screen and an example of a box information management table maintenance screen displayed in a display unit 206.

FIG. 9B is a diagram illustrating an example of a procedure for creating and changing a box information management table according to the first embodiment.

FIG. 17 is a diagram illustrating an example of a user information management table according to a variation on the second embodiment of the present invention.

FIG. 18 is a diagram illustrating an example of a box management table according to a variation on the second embodiment of the present invention.

FIG. 19 is a diagram illustrating an example of a user information management table according to a variation on the second embodiment of the present invention.

FIG. 20 is a diagram illustrating an example of a box management table according to a variation on the second embodiment of the present invention.

DESCRIPTION OF THE EMBODIMENTS

First Embodiment

Figure 1:
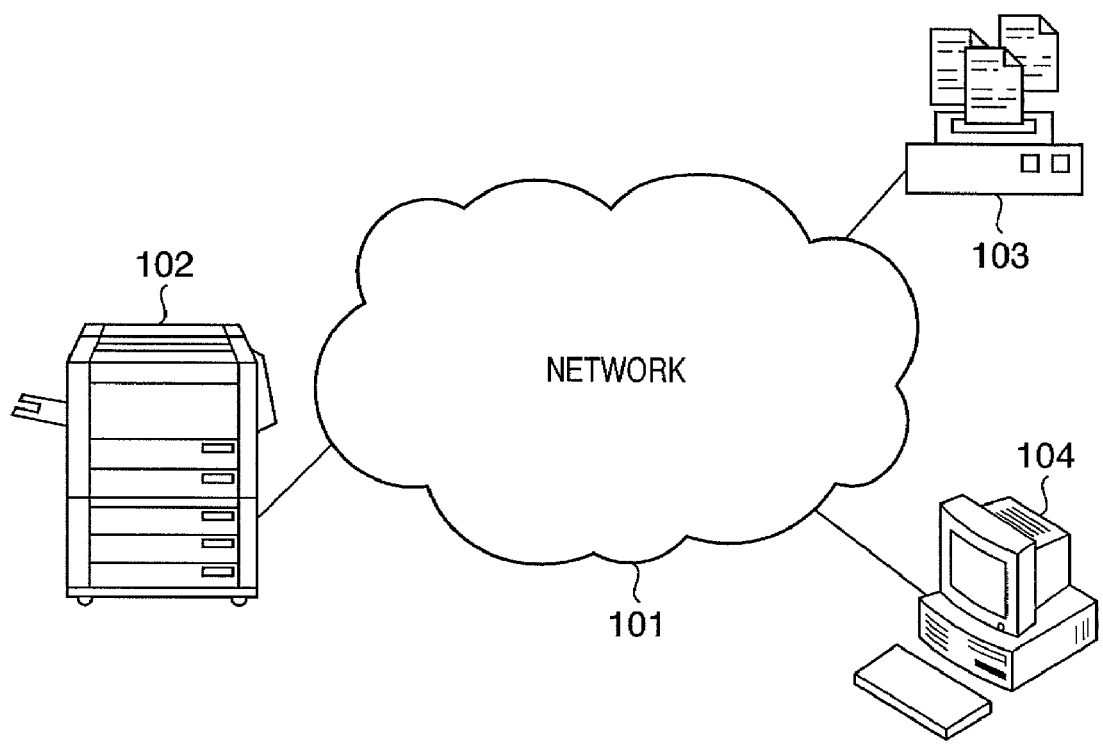
FIG. 1 is a diagram illustrating an example of a configuration of an image forming system according to the present invention.

An image processing apparatus according to the first embodiment of the present invention shall be described hereinafter. FIG. 1 is a diagram illustrating the configuration of a network in which a digital multifunction apparatus (referred to simply as a "multifunction apparatus" hereinafter), serving as an image processing apparatus according to the first embodiment of the present invention, can be applied. A network 101 shown in FIG. 1 supports, for example, TCP/IP protocol. A multifunction apparatus 102, print server 103, and client computer 104 used by a general user are connected to the network 101.

For example, it is possible to print documents using the multifunction apparatus 102, store documents in a box within the multifunction apparatus, and so on by sending print data from the client computer 104 to the multifunction apparatus 102 via printer drivers installed in the client computer 104. In such a case, the client computer 104 may send the print data to the print server 103, and the print server 103 may perform a printing process, a storage process, and so on for the multifunction apparatus 102. Furthermore, setting up a hot folder in the box in which the document is to be stored makes it possible for the stored document to be, for example, linked with a predetermined document and printed, sent to a predetermined destination, and so on. "Hot folder" refers to a folder that has been associated with a process or a processing sequence that is executed on inputted (stored) data. When data is inputted to a hot folder, the process associated with that hot folder is executed on the inputted data. A box that has this hot folder function may also be referred to simply as a "hot folder". It should be noted that the configuration shown in FIG. 1 is merely a general outline of such a configuration; hence there may be plural computers used by general users, plural multifunction apparatuses, and so on.

Multifunction Apparatus Configuration

FIG. 2 is a block diagram illustrating an outline of a configuration of a digital multifunction apparatus 102. A central processing unit (CPU) 201 executes a control program stored in a ROM (Read-Only Memory) 202 or a hard disk 203. Through this, various information, such as operating conditions and management data for the various units within the device connected via a system bus 218, is stored. A folder management table such as that illustrated in FIG. 3 (mentioned later) and a user management table such as that illustrated in FIG. 4 (also mentioned later) can also be stored. Furthermore, programs for implementing the flowcharts appended to the present specification can also be executed.

A control unit 205 executes various functions and various processes of the present invention (mentioned later) using a RAM (Random Access Memory) 204, in which is stored data necessary for operations. It is possible to use only one of the control unit 205 and the CPU 201, or the functions of the control unit 205 and the CPU 201 may be integrated together. A display unit 206 displays various information such as operational conditions, device statuses, or inputted information. A console unit 207 is configured of keys such as a numerical keypad or a start key, or is a touch panel within the display unit 206, for the user to perform input operations such as settings, instructions, or the like. A communication control unit 208 connects to an intranet or the Internet via a wireless or hard-wired network, and sends/receives document data including image data, control commands, and the like. A network control device 209 connects to a PSTN (Public Switched Telephone Network), executes a predetermined line control when signals are outgoing/incoming, and connects or disconnects from the line. In addition, image data, control signals, and the like are sent/received through facsimile by being modulated/demodulated through a built-in modem device and sent/received via the network control device 209.

A reader device 211 reads image data by irradiating light onto a paper document to be sent, copied, or stored, and converting the light reflected from the image into a corresponding electric signal. The read image data is sent, copied, or stored in the hard disk 203 via a printing control unit 210.

A print recording device 212 receives image data or print data from an information source such as the reader device or a client computer via the printing control unit 210, forms the data on recording paper as a permanent visible image, and ejects the recording paper.

An image memory 213 temporarily stores the read or received image data, print data, and so on. The image memory 213 may be included within the hard disk 203, RAM 204, or the like, depending on the device, format, and so on. An image processing unit 214 performs processes for encoding image data to be sent, decoding received image data, converting received print data into image data, converting image data to be stored into an appropriate format or a format specified by a user, and so on. The image processing unit 214 also performs image correction processing in response to the optical response characteristics of the reader device 211 and inconsistencies between senders, image processing for scaling the image and so on in response to input from the user via the console unit 207, and so on. The image processing unit 214 furthermore performs image optimization processing in accordance with the write characteristics of the print recording device 212 on the image data, as required. An authorization processing unit 215 authorizes print jobs, in addition to authorizing users, workgroups, and the like.

A box information management unit 216 holds a box information management table 300 such as that illustrated in FIG. 3. The box information management unit 216 holds process parameters as box attributes, the process parameters being associated with a document storage area ("box", hereinafter) provided within the hard disk 203, and manages the process parameters, update information, and so on. Note that the box information management table 300 is also referred to as a folder management table.

A user information management unit 217 holds a user information management table 400 such as that illustrated in FIG. 4, and manages information regarding access to each of the boxes by the users authorized by the authorization processing unit 215. Note that the user information management table 400 is also referred to as a user management table.

The system bus 218 connects the CPU 201, ROM 202, hard disk 203, RAM 204, control unit 205, display unit 206, console unit 207, communication control unit 208, printing control unit 210, image memory 213, image processing unit 214, and so on. The system bus 218 also connects the authorization processing unit 215, box information management unit 216, and user information management unit 217.

According to the stated configuration, the multifunction apparatus of the present embodiment includes a facsimile communication function for transmitting read image data, a forwarding function for forwarding data to a document management server computer, a copying function for printing/ outputting read image data, and so on. This multifunction apparatus further includes a printing/receiving function for receiving image data via facsimile or the like and printing the image data, a printing function for receiving print data from a client computer and printing that print data, and a box function for storing read image data and received image data in a box. In other words, this multifunction apparatus can be used not only as a copy machine, but also as a facsimile device, a printer device, a scanner device, and a storage device. It should be noted that the print recording device 212 may be, for example, an inkjet type, thermal head type, dot impact type, or other such type, rather than an electrophotographic recording type.

Details, attributes (parameters), and the like regarding processing associated with the box are stored in the box information management table 300 illustrated in FIG. 3. "Box number" refers to a unique identification number given to each box in a single multifunction apparatus. A name for the box, defined by a user, is stored in a name column. An attribute column includes a hot folder setting column, a trigger setting column, a process parameter setting column, a process attributes setting column, and an update information storage column. The hot folder setting column stores a value denoted as "set" in the case where some sort of process is defined in the process parameter column, and stores a value denoted as "unset" in other cases. If the hot folder setting column is "unset", the box in question is a folder used for storage. A trigger for executing the process defined in the process parameter setting column is specified in the trigger setting column. For example, if the setting is "entry", document data entering (that is, being inputted to or stored in) the box in question is used as a trigger, and the process specified in the process parameter setting column is carried out on that document data. As another example, if the setting is "user n login", the process specified in the process parameter setting column is executed on document data stored in the box in question upon a user logging into the system under the username "user n".

Figure 12:
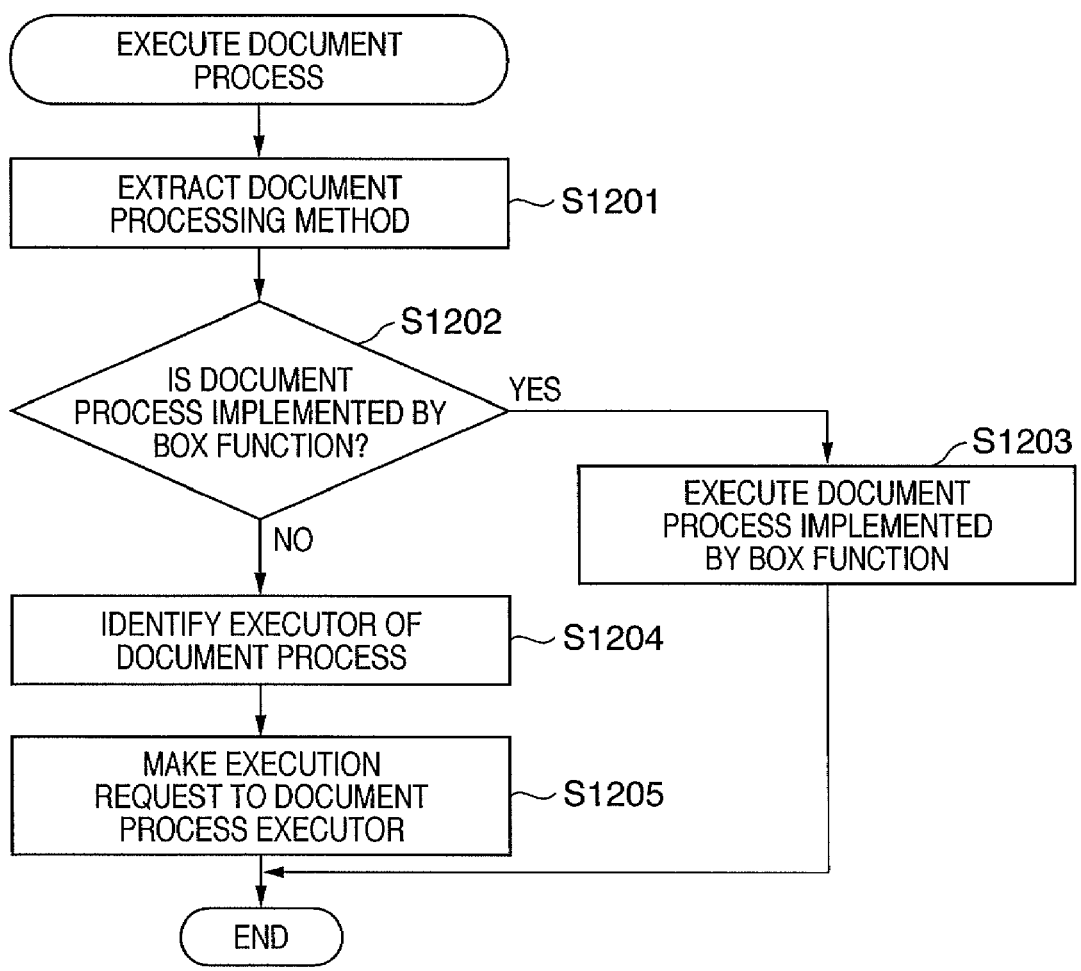
FIG. 12 is a flowchart illustrating an example of a document processing procedure implemented by a hot folder according to a second embodiment of the present invention.

Information indicating a process parameter specified by a user is stored in the process parameter setting column. "Print", "send", "edit", "back up", "request", and so on are examples of process parameters. Furthermore, "exterior" indicates the execution of a process defined separately, such as is illustrated in FIG. 12. Attributes (also called parameters) defined by the user for each process parameter is stored in the process attributes setting column. For example, if the process parameter is "print", printing settings such as the size, layout, whether to print in grayscale or color, and bound book printing can be specified as the process attributes. A predetermined default setting is used when no specification has been made. When the process parameter is "edit", the details of the editing to be performed, such as, for example, linking or deleting documents, inserting cover sheets or templates, inserting page numbers, deleting blank pages, inserting print dates/times and usernames, are set as the process attributes. When the process parameter is "send", the media type (facsimile, e-mail, and so on) and addresses according to the media type (a facsimile number, an e-mail address, and so on) are stored as the process attributes. The date on which a definition was made or updated for a box is stored in the update information storage column. The time may also be stored, considering that it is possible for plural updates to occur in a single day.

A username, the user's department, and hot folder process execution information associated with the username are stored in the user information management table 400 illustrated in FIG. 4. Whether or not the user used a particular box (that is, whether or not the user has inputted document data) is recorded on a box-by-box basis in the hot folder process execution information.

Multifunction Apparatus User Interface

Figure 5:
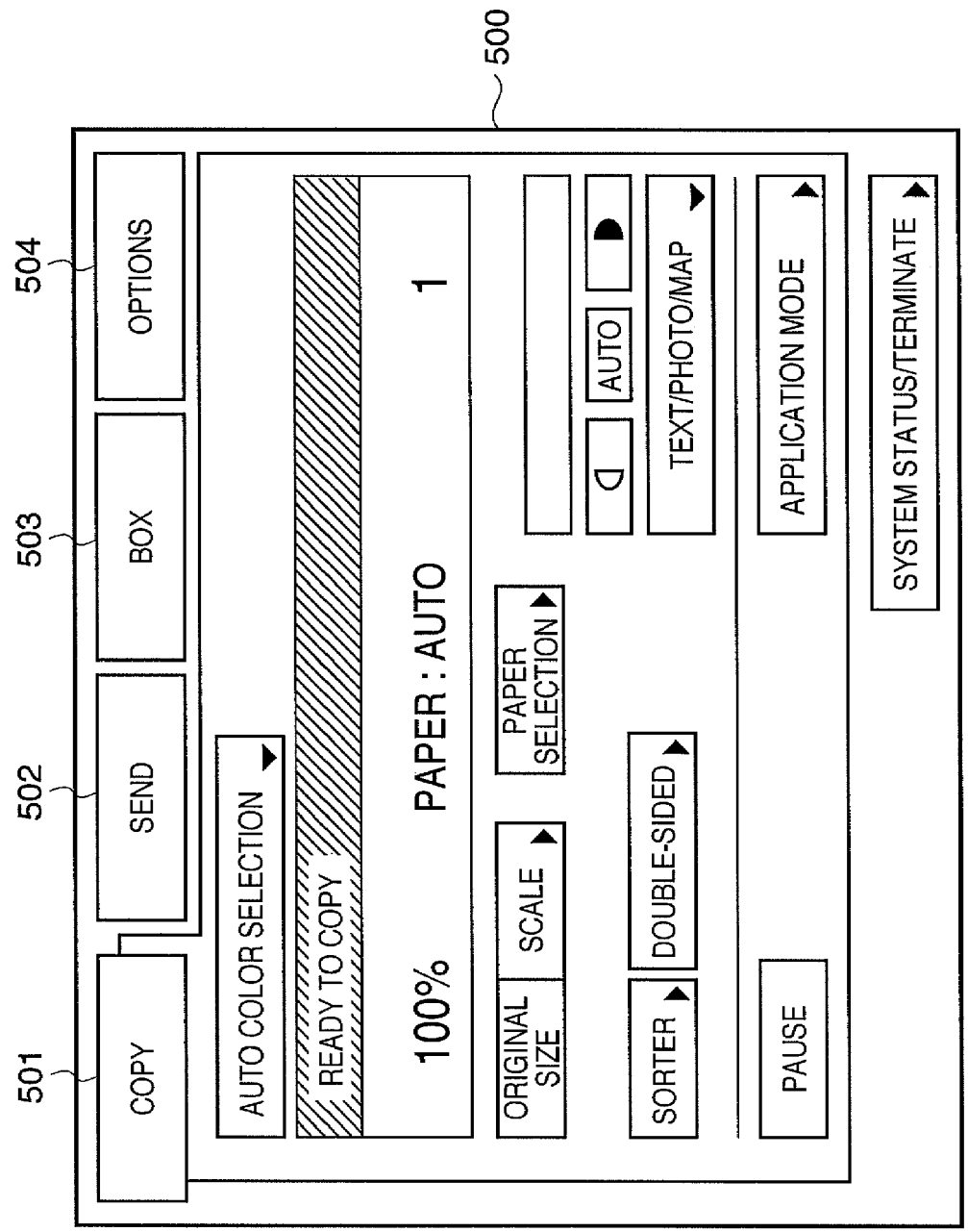
FIG. 5 is a diagram illustrating an example of an initial screen displayed in a display unit 206.

FIG. 5 is a diagram illustrating an example of a screen displayed in the display unit 206. This screen is a setting screen 500, displayed as an initial screen, and used when performing various settings regarding the copy function. In FIG. 5, tabs 501 to 504 are a "copy" tab, a "send" tab, a "box" tab, and an "options" tab, respectively, and a basic screen for a function is displayed upon the corresponding tab being pressed. Although FIG. 5 shows that the copy function has been selected as the initial screen, the send function, box function, or the like may be selected as the initial screen instead.

Figure 6:
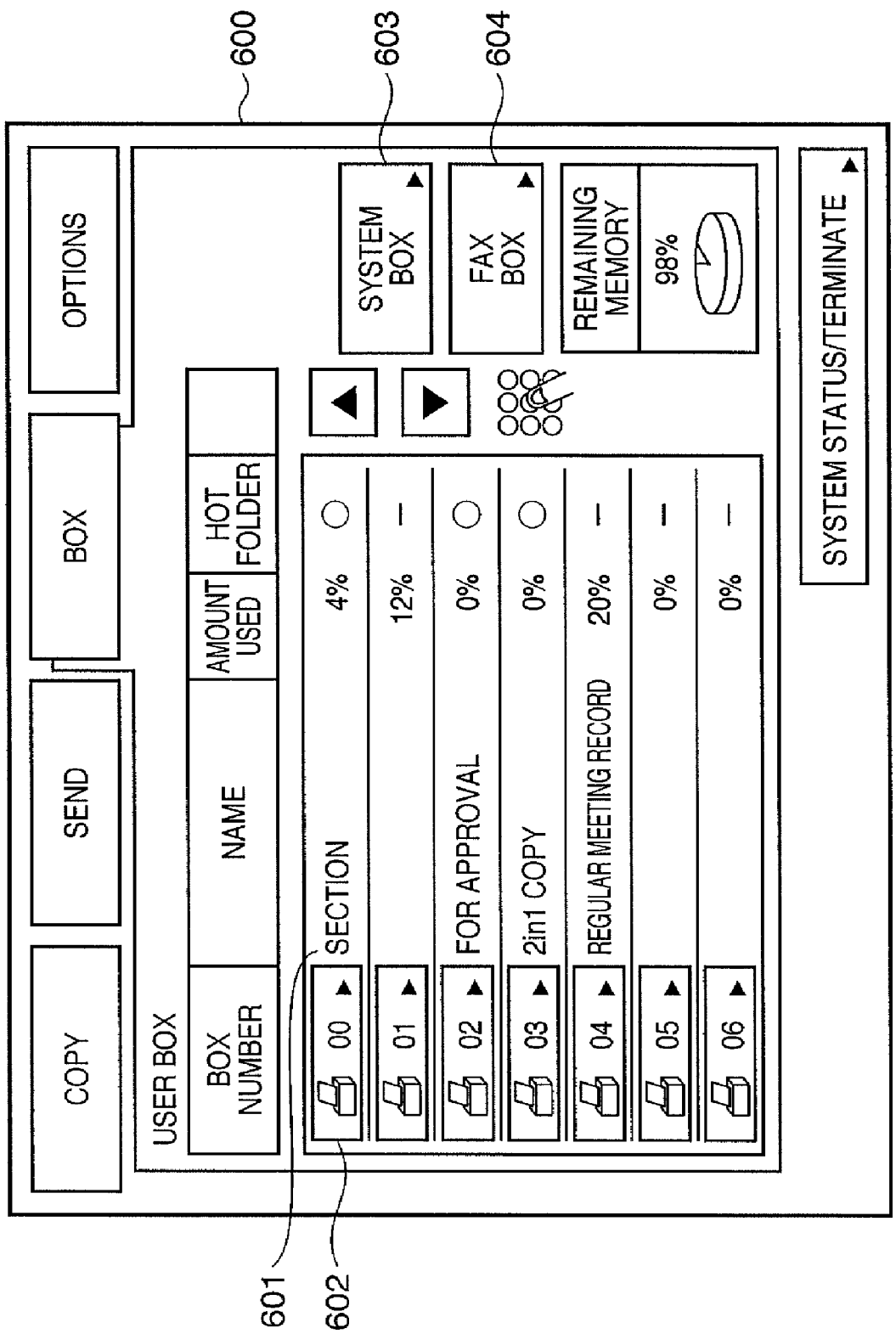
FIG. 6 is a diagram illustrating an example of a box list screen displayed in the display unit 206.
Figure 7:
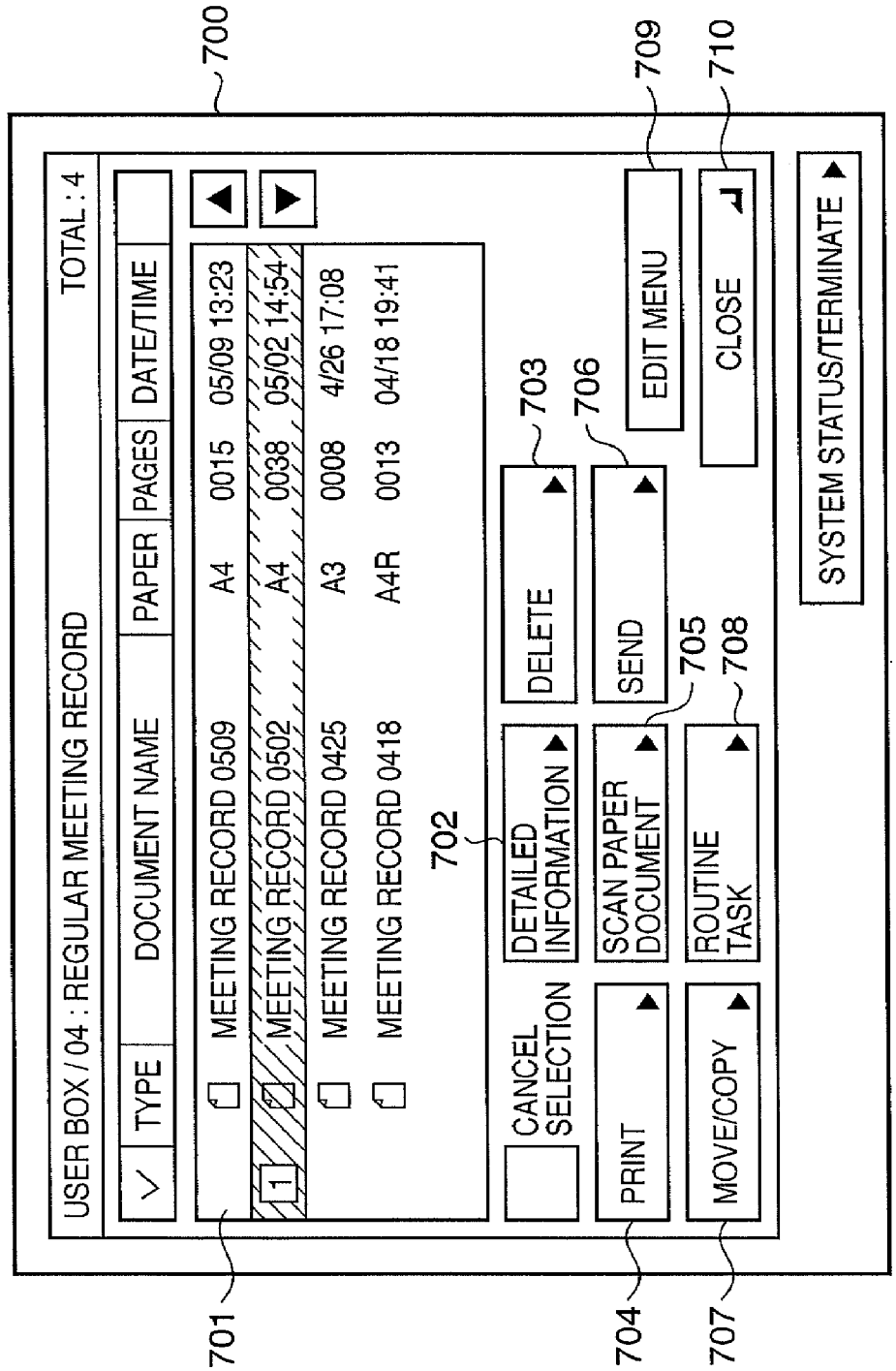
FIG. 7 is a diagram illustrating an example of a document list screen displayed in the display unit 206.

FIG. 6 is a diagram illustrating another example of a screen displayed in the display unit 206. This screen is a box list screen 600, which is the basic screen for the box function. In FIG. 6, a field 601 is a box information display field, in which is displayed the name, space used, and the presence/absence of hot folder settings for each box. A user can transit to a document list screen 700 that lists the documents within a box, such as is illustrated in FIG. 7, by pressing a "select box" key 602. The user can also transit to the basic screen for a system box (not shown) by pressing a "system box" key 603. Furthermore, the user can transit to the basic screen for a fax box (not shown) by pressing a "fax box" key 604.

FIG. 7 is a diagram illustrating another example of a screen displayed in the display unit 206. This screen is the document list screen 700, listing the documents within the box selected using the box list screen shown in FIG. 6. In FIG. 7, a field 701 is a document information display field, displaying the type, document name, paper size, number of pages, and date/time for each document. Soft keys 702 to 710 are keys for carrying out various operations and settings. A screen that displays detailed information (not shown) is displayed on the document list screen by pressing a "detailed information" key 701. The document currently selected in the document information display field 701 can be deleted by pressing a "delete" key 703. Pressing a "print" key 704, a "send" key 706, a "move/copy" key 707, or an "edit menu" key 709 displays a setting screen (not shown) corresponding to the pressed key. Pressing an "scan paper document" key 705 transits the screen to a paper document scanning screen 800, such as that shown in FIG. 8, makes it possible to perform settings for scanning image data to be stored in the currently-selected box. Pressing a "close" key 710 returns to the box list screen shown in FIG. 6. Pressing a "routine task" key 708 transits to a screen in which routine task buttons, to which oft-used settings are registered, are arranged, such as the screen shown in FIG. 9.

FIG. 8 is a diagram illustrating another example of a screen displayed in the display unit 206. This screen is the paper document scanning screen 800, through which various settings for scanning a paper document are performed, and is displayed when a user presses the "scan paper document" key 705 shown in FIG. 7. In FIG. 8, display columns 801 to 803 are a status display area, a size display area, and a read size display area, respectively, and display the current status, setting parameters, and so on. Pressing a "size settings" key 804, "read size settings" key 805, "double-sided settings" key 806, "darkness settings" key 807, "image mode settings" key 808, or "application mode" key 809 displays the corresponding setting screen (not shown). Pressing a "document name input" key 810 displays a document name input screen (not shown), through which the name of the document to be stored can be set. Here, when the document name is set, the set document name is displayed in a document name display field 811. The various settings made through this screen can be cancelled and the screen returned to its original state by pressing a "reset" key 812. Pressing a "cancel" key 813 returns the screen to the document list screen 700 shown in FIG. 7. Finally, pressing a "system monitor" key 814 displays a system monitor screen through which the status of the overall system, jobs, and so on can be checked.

Box and Association Process

FIG. 9A is a diagram illustrating an example of a screen displayed in the display unit 206. This screen is a box process display screen 900 displayed when the "routine task" key 708 shown in FIG. 7 is pressed, and is used to display and edit the process parameters and process attributes associated with the selected box. In FIG. 9A, area 901 is an area in which registered buttons are arranged. A user can select a desired document through the screen shown in FIG. 7, and select the processing to be performed on the selected document by pressing the desired button from among the buttons arranged in the area 901. Note that the process associated with the box is independent from documents, and thus selection of the documents within the box is not necessary. Therefore, by selecting a box from the screen shown in FIG. 6 and pressing, for example, an edit button, a user may display the screen shown in FIG. 9A (a list pf processes associated with the box). Through this operation, the desired process can be implemented without having to make detailed settings. Pressing a button 902 returns to screen to the state shown in FIG. 7.

FIG. 9A illustrates an example of a case where a box number 04 defined in the box information management table 300 of FIG. 3 has been selected. The box number 04 and the box name "annual proceedings" are displayed in the upper area of the screen 900. The process parameters and process attributes associated with the box 04 are displayed as buttons on a parameter-by-parameter basis in the area 901. For example, the process parameter "send", shown in FIG. 3 and which accompanies a process attribute of "E-mail (to Company X)", is displayed in FIG. 9A as a button labeled "Send to Company X". If this button is selected and a delete button (not shown) is then pressed, the selected parameter and attribute are deleted from the box information management table 300.

FIG. 9B illustrates an example of a process procedure for defining the process to be associated with a box, or in other words, a procedure performed when creating the box information management table 300. However, note that FIG. 9B illustrates a process for adding process parameters. When deleting process parameters, the button for performing a process for deleting the parameters from the area 901 is selected, and the delete button (not shown) is pressed. The entries in the selected table are deleted thereby.

In FIG. 9B, first, it is determined whether or not the definitions have ended, or in other words, whether or not the end button has been pressed (S911). If the definition is not complete, the selected process is associated with the box selected in the box information management table 300 and added to the box information management table 300 (S913). Next, the selected attribute is associated with the box selected in the box information management table 300 and added to the box information management table 300 (S915). In addition to parameters for the process stored in the process attributes setting column, an event serving as a trigger (called a "trigger event") set in the trigger setting column is also included in the set attributes. On the other hand, if the definition process has ended, a name is added to the box information management table 300 as the name of the box in the case where that name has been inputted (S917). Lastly, the box information management table 300, which is being stored temporarily in the RAM or the like, is stored in a non-volatile storage medium such as the hard disk (S919).

A process associated with a box can be created or stored through the abovementioned procedure. Of course, a box information management table created using a computer connected to the multifunction apparatus may loaded into the multifunction apparatus.

Note that a screen similar to that shown in FIG. 9A may also be displayed in the case where a document is selected from the screen shown in FIG. 7 and the routine task button 708 is pressed by a user. In such a case, the hot folder function is not edited, and instead, the process corresponding to the button pressed by the user from among the buttons displayed in area 901 of FIG. 9A is executed on the selected document data. Such definitions of functions corresponding to buttons is are stored separate from the box information management table 300 and maintained. The procedure for registering functions may be a procedure similar to that shown in FIG. 9B. However, the defined process parameters and process attributes are associated per button and stored in a table (called a "button function management table in the present example).

Box Processing Procedure

Figure 10:
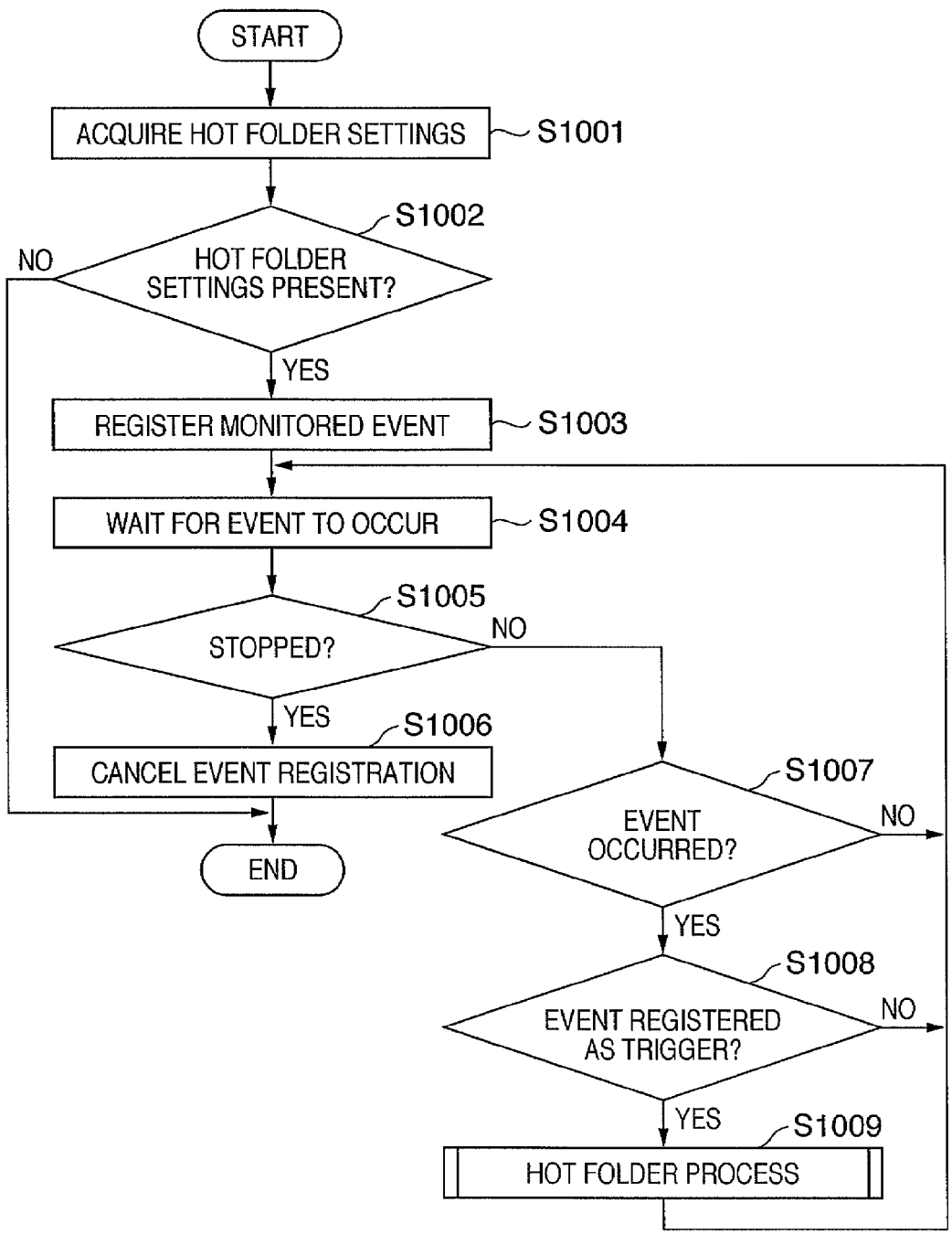
FIG. 10 is a flowchart illustrating an example of processing procedures for each of plural boxes present within a multifunction apparatus according to an embodiment of the present invention.

FIG. 10 is a flowchart illustrating an example of each process procedure for plural boxes present within the multifunction apparatus, according to the first embodiment of the present invention; S1001 to S1009 indicate each step of this procedure. This process is executed by the CPU 201 in accordance with a program stored in the ROM 202 or the hard disk 203 of the multifunction apparatus 102. It should be noted that the "implementation of hot folders in a box" in the present invention refers to making settings that cause a pre-set action (box function) to be executed on a document inputted into a box in the multifunction apparatus, based on a pre-set event. In other words, consider, for example, a case where, for box number 10, "document entry" is set as the event that acts as a trigger, and "stapled print, two copies" is set as the action to be performed in response to this trigger. In this case, if a document is scanned and stored in box number 10, two stapled copies of the document that entered box number 10 will be printed out.

When the multifunction apparatus is turned on, and the box function of the multifunction apparatus is turned on, Step S1001 is carried out, whereby the hot folder settings for each box are acquired. The "acquired hot folder settings" refers to the box information management table 300 shown in FIG. 3. In Step S1002, it is checked whether or not hot folder settings are present. The item tested in Step S1002 is the hot folder setting column of the box information management table 300.

In the case where it is determined in Step S1002 that hot folder settings are not present, the box is used as a normal box, without hot folder settings being made. However, in the case where it is determined that hot folder settings are present, the procedure moves to Step S1003, and the event to be used as the set trigger is registered to be monitored. There are cases where a process parameter (action) specifying that, for example, document data is to be printed/stapled, using the input of the document data as the trigger event, is set. Furthermore, there are also cases where an action specifying that, for example, a document stored within the box is to be edited, printed, or the like, using a specific user logging into the system as the trigger event, is set. In these cases, the respective trigger events are the document data being inputted into the box or the specific user logging into the system. Information indicating these trigger events is stored in a predetermined memory area, and this storage is equivalent to the event monitoring registration carried out in S1003. From the standpoint of ease of settings, monitoring, and so on, it is preferable for events that can be registered as triggers to be selected from a pre-set list of event candidates.

When the event monitoring registration ends, the procedure moves to Step S1004, where the system waits for an event to occur. In step S1004, whether or not the event registered in Step S1003 has occurred is monitored. For example, if input is the trigger, whether or not document data has been written to the area defined as the box is monitored. Or, if login is the trigger, a "authorization complete" answer from a user authorization module, for example, is monitored.

In FIG. 10, even if a trigger event does not occur, the procedure periodically, for example, proceeds to Step S1005, where it is determined whether or not the hot folder function has stopped due to termination of the multifunction apparatus or the like. If the function has stopped, the procedure moves to Step S1006, where the event registration performed on startup is cleared. The process then ends.

If the function has not stopped, the procedure moves to Step S1007, where it is determined whether or not a trigger event has occurred. If a trigger event has not occurred, the procedure returns to Step S1004, and the system returns to a state in which it waits for an event to occur.

If it is determined in Step S1007 that an event has occurred, the procedure moves to Step S1008, where the details of the event are tested. If the event that has occurred is not a trigger event registered in the box information management table 300, the procedure returns to Step S1004, and the system waits for an event to occur. However, if the event is a trigger event, the procedure moves to Step S1009, and the hot folder process is performed. Note that the hot folder process is a process specified by the process parameters and process attributes corresponding to the box in question, which are registered in the box information management table 300. Furthermore, Step S1008 is unnecessary in the case where the event occurrence monitoring is limited to trigger events. However, it is necessary to determine whether or not a user that logged in in Step S1008 has been registered as a trigger event in the case where, for example, user logins can be monitored but logins identified by user IDs cannot be monitored.

Figure 11:
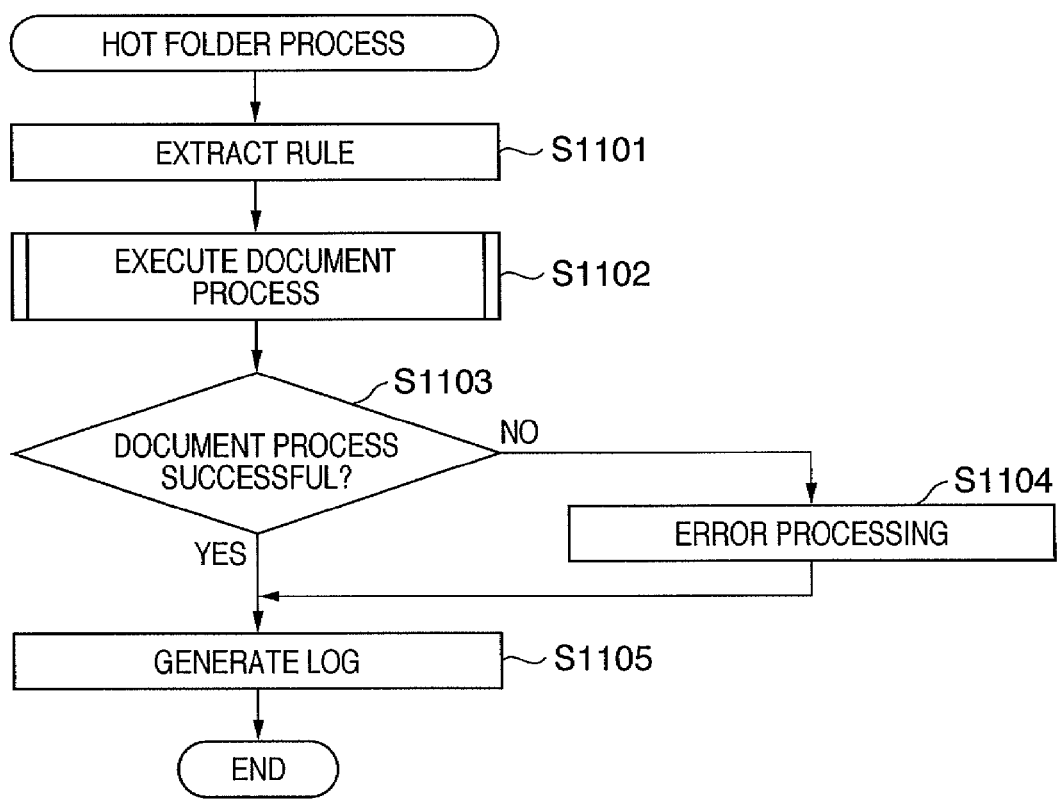
FIG. 11 is a flowchart illustrating an example of a hot folder processing procedure according to an embodiment of the present invention.

FIG. 11 is a flowchart illustrating the details regarding Step S1009 in FIG. 10; S1101 to S1105 indicate each step of this procedure. This process is executed by the CPU 201 in accordance with a program stored in the ROM 202 or the hard disk 203 of the multifunction apparatus 102.

When the hot folder process is commenced, in Step S1101, rules, or in other words, the specific process parameters, are extracted based on the information registered in the process parameter setting column and the process attributes setting column of the box information management table 300. "Specific process parameters" refers to the process parameters and process attributes defined in the box information management table 300, and the specific process parameters that correspond thereto. For example, if the process parameter in question is "edit" and the process attribute in question is "link document", an identifier for the document to be linked, an identifier for the post-linkage document, the storage destination, and so on are included in the process parameters. The identifier for the post-linkage document may be generated automatically, although generation of such a parameter is carried out in Step S1101. In other words, extraction of process parameters refers to determining the specific values of the process attributes. The determined process attributes are stored, for example in a memory or the like. When the process parameter is "exterior", there is no parameter.

When the specific process parameters are determined, in Step S1102, the document process is executed in accordance with the process parameters of the box information management table 300 and the process parameters determined in Step S1101. Next, in Step S1103, it is determined whether or not the document process was successful. If it is determined that the process failed, the procedure moves to Step S1104, where error processing is performed as necessary. Then, in Step S1105, a log is generated and process ends, regardless of whether the process succeeded or failed.

FIG. 12 is a flowchart illustrating the details regarding Step S1102 in FIG. 11; S1201 to S1205 indicate each step of this procedure. This process is executed by the CPU 201 in accordance with a program stored in the ROM 202 or the hard disk 203 of the multifunction apparatus 102.

When the document process is commenced, in Step S1201, the document processing method is extracted. However, because a rule has been extracted and stored in Step S1101 of FIG. 11, Step S1201 may simply refer to that rule. Next, in Step S1202, it is determined whether the document process about to be executed is a document process implemented by a box function. In the case where the process parameter setting column in the box information management table is set to "exterior", it is determined here that the present process is not implemented by a box function. "Box function" refers to a function implemented by a process defined in the box information management table 300. Printing a box document, moving a box document, copying a box document, deleting a box document, and so on are examples of document processes implemented by box functions. A process sequence that takes these processes as elements, spanning from setting the format of and printing a box document to deleting that box document, is defined as a box function.

If the document process is implemented by a box function, the procedure moves to Step S1203, where the document process implemented by the box function is executed. In other words, a process is executed in accordance with the process parameters read out from the box function management table 300, the specific parameters that have been determined, and so on.

On the other hand, if the document process is not implemented by a box function (that is, if the process parameter is "exterior"), the procedure moves to Step S1204, where the executor of the document process (the initiator of the execution) is identified. In present embodiment, the specific executor of the document process is assumed to be the process that executes a routine task. In other words, an execution request is made to the routine task execution process, which is the document process executor. To be more specific, the same operations are performed as when pressing the routine task button 708 after selecting a document on the screen. However, in the case where plural functions are registered as a routine task, a single one of those functions is isolated. The isolated function may be pre-registered in a table provided separately, or may be registered in the box information management table 300 during the procedure shown in FIG. 9B. Execution is requested of the routine task execution process in this manner, with an identifier specifying an already-registered routine task button and an identifier specifying the document to be processed. If the routine task execution process has already been defined at the time of manufacture of the multifunction apparatus, a user can utilize that process without specifying a particular routine task.

Through the abovementioned method, hot folders can be implemented in a box of a multifunction apparatus. It is furthermore possible to provide a hot folder capable of calling a routine task registered to be executed in response to a specific event. In other words, when implementing a hot folder in a box of a multifunction apparatus, a function for combining other functions the multifunction apparatus and executing those functions, a function for executing processes according to a procedure, or applications within the multifunction apparatus and external services, can be associated with each box. When a document then enters the box, the associated function, application, or service is executed. This makes it possible to provide an image processing apparatus capable of providing a variety of conceivable functions without having to develop those functions specifically for the box of the multifunction apparatus.

Variation 1

Next, an image forming system according to a first variation on the first embodiment of the present invention shall be described. Note that the image forming system in the present variation utilizes the same network configuration (shown in FIG. 1) and the same multifunction apparatus configuration (shown in FIG. 2) as the aforementioned first embodiment. In the first embodiment, providing a hot folder capable of calling a registered routine task makes it possible to provide a variety of conceivable functions without having to develop those functions specifically for a box of a multifunction apparatus. Recently, with advancements in multifunction apparatuses, multifunction apparatuses provided with application platforms such as, for example, MEAP (Multifunctional Embedded Application Platform) have appeared. Under the MEAP system, it is possible to implement a variety of workflows using a multifunction apparatus by developing a MEAP application and installing/running that application on the multifunction apparatus. A hot folder capable of calling such a MEAP application in response to a specific event may be provided as well.

Variation 2

Next, an image forming system according to a second variation on the first embodiment of the present invention shall be described. Note that the image forming system in the present variation utilizes the same network configuration (shown in FIG. 1) and the same multifunction apparatus configuration (shown in FIG. 2) as the aforementioned first embodiment. In the first embodiment, providing a hot folder capable of calling a registered routine task makes it possible to provide a variety of conceivable functions without having to develop those functions specifically for a box of a multifunction apparatus. Recently, with advances in multifunction apparatuses, it has become possible to call external services, an example of which is a web service. A hot folder capable of calling such an external service in response to a specific event may be provided as well.

Second Embodiment

Next, an image forming system according to a second embodiment of the present invention shall be described. Note that FIGS. 1 to 9A apply in the same manner as with the first embodiment, and thus explanations thereof shall be omitted.

Figure 16:
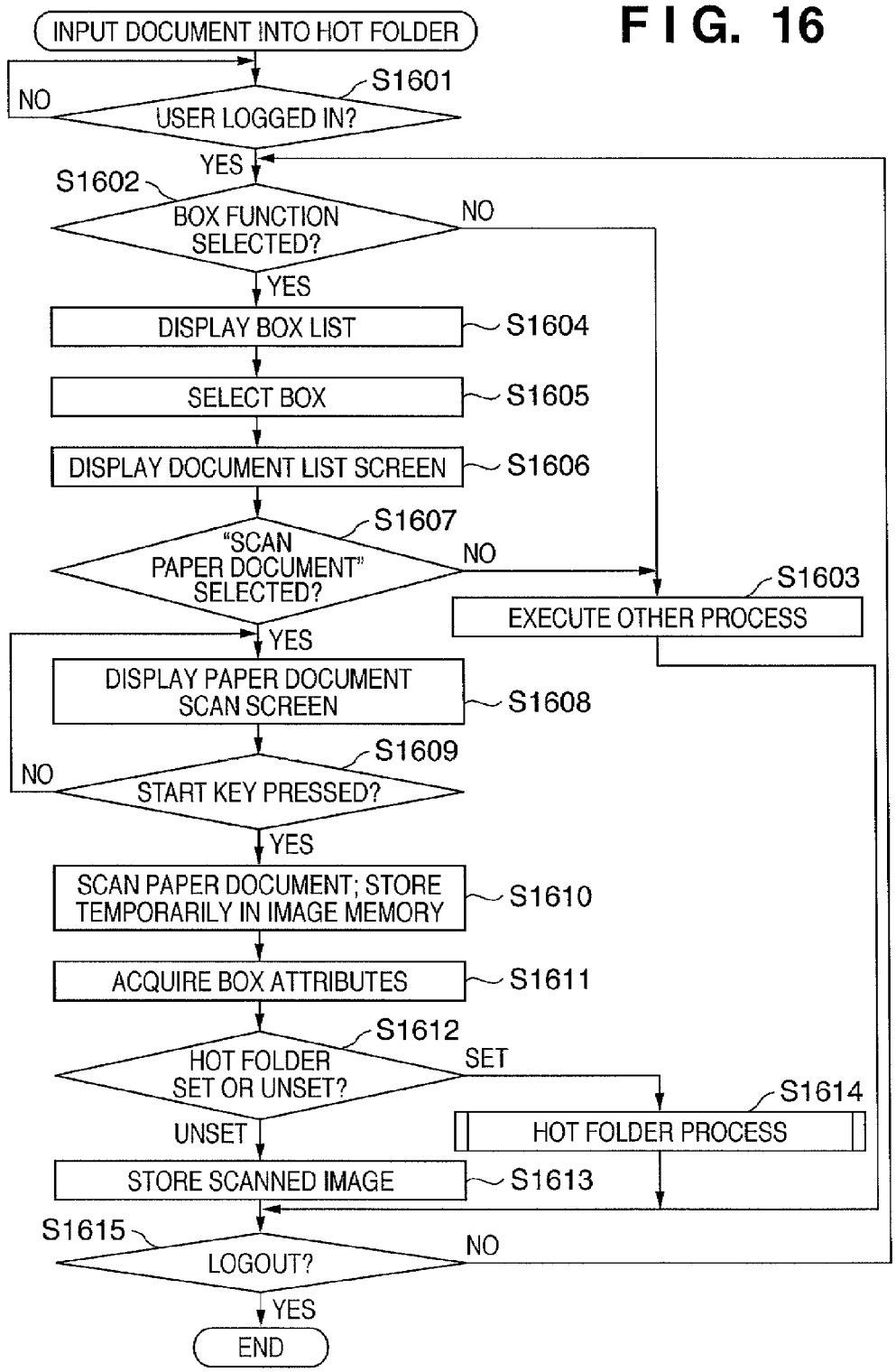
FIG. 16 is a flowchart illustrating an example of a processing procedure for storing a document in a box in which hot folders have been implemented in an image forming system according to the second embodiment of the present invention.

FIG. 16 is a flowchart illustrating an example of a processing procedure for storing a document in a box in which hot folders have been implemented according to the second embodiment of the present invention; S1601 to S1615 indicate each step of this procedure. This process is executed by the CPU 201 in accordance with a program stored in the ROM 202 or the hard disk 203 of the multifunction apparatus 102.

First, in Step S1601, it is determined whether or not a user has logged in to the system; if it is determined that a user has not logged in to the system, this process continues until a user logs in. If it has been determined in Step S1601 that a user has logged in to the system, in Step S1602, a copy function setting screen, which is an initial screen, is displayed, and it is then determined whether or not a "box" tab 503 has been pressed.

If it is determined in Step S1602 that the "box" tab 503 has not been pressed, other processes are performed in Step S1603, and the procedure then moves to Step S1615. If the "box" tab 503 has been pressed in Step S1602, the box list screen illustrated in FIG. 6 is displayed (Step S1604).

In Step S1605, when a "select box" key 602 is pressed, a document list screen corresponding to the selected box as shown in FIG. 7 is displayed (Step S1606). In Step S1607, it is determined whether or not the "scan paper document" key 705 has been pressed, and if it is determined that the key has not been pressed, other processes are performed in Step S1603, and the procedure then moves to Step S1615. If it is determined in Step S1607 that the "scan paper document" key 705 has been pressed, the paper document scanning screen shown in FIG. 6 is displayed (Step S1608).

In Step S1609, it is determined whether or not a start key (not shown) on the console unit 207 has been pressed, and if it is determined that the start key has not been pressed, the procedure returns to Step S1608. If it is determined in Step S1609 that the start key has been pressed, scanning of the paper document is commenced in Step S1610. The reader device 211 is driven and the image scanned, and the image data resulting from the scan is temporarily stored in the image memory 213. In Step S1611, the box attributes of the box in question are acquired from the box information management table shown in FIG. 3, and information regarding whether a hot folder function is set or unset, included in these attributes, is acquired.

In Step S1612, whether or not a hot folder process is set for the selected box is determined based on the box attributes regarding hot folder settings, as acquired in Step S1611. If it is determined in Step S1611 that a hot folder is not set, the image data stored in the image memory 213 in Step S1610 is stored in a selected box area within the hard disk 203 (Step S1613), and the procedure then moves to Step S1615. However, if it is determined in Step S1611 that a hot folder is set, the hot folder process indicated in FIG. 10 is performed in Step S1614, and the procedure then moves to Step S1615.

In Step S1615, it is determined whether or not a logout has been requested, and if it is determined that a logout has not been requested, the procedure returns to Step S1602. However, if it is determined that a logout has been requested, the process ends.

Figure 14:
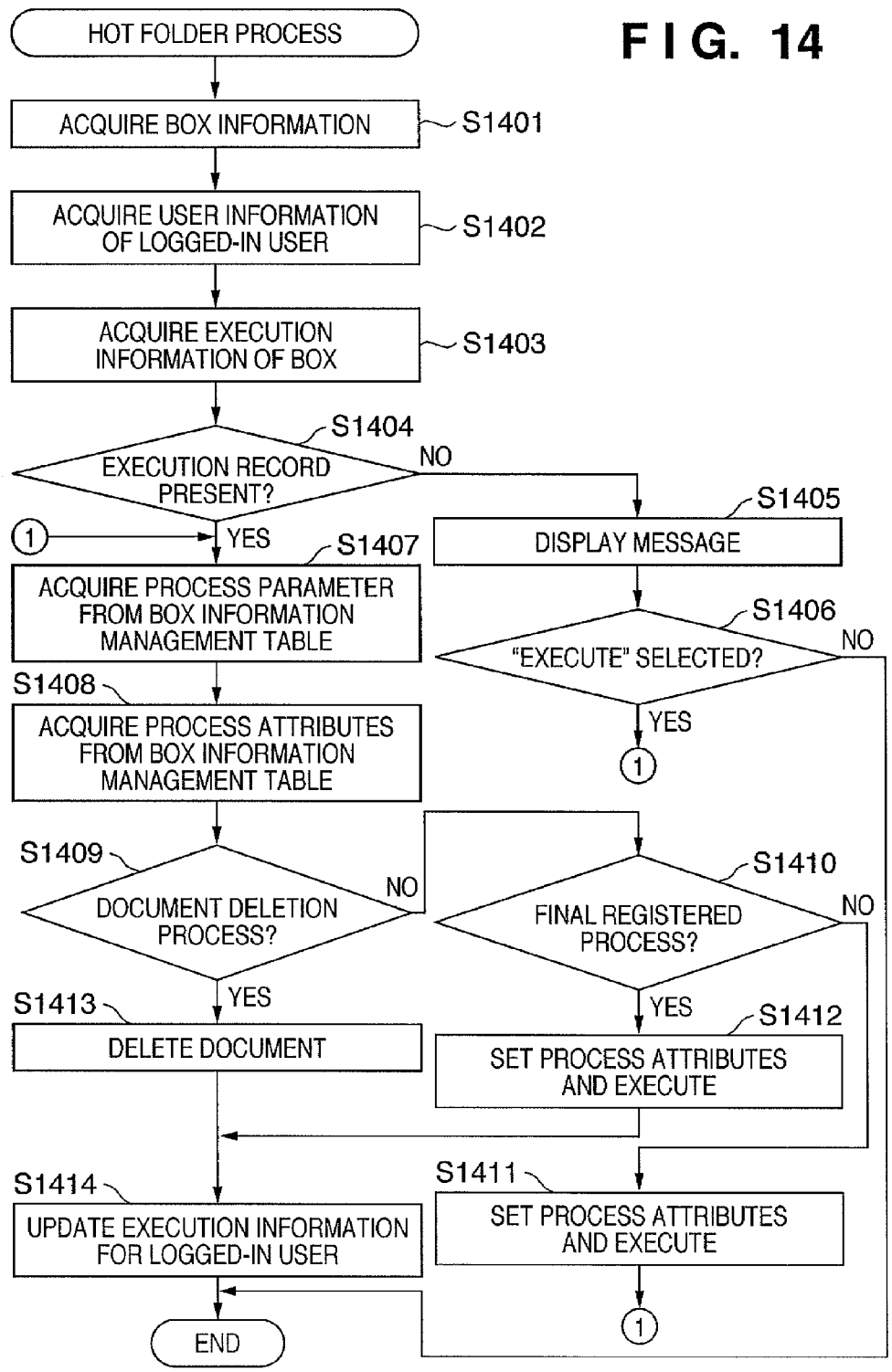
FIG. 14 is a flowchart illustrating an example of a data processing procedure in a box in which hot folders have been implemented according to an embodiment of the present invention.

FIG. 14 is a flowchart illustrating an example of a hot folder processing procedure (S1614 in FIG. 16) in a box in which hot folders have been implemented according to the second embodiment of the present invention; S1401 to S1414 indicate each step of this procedure. This process is executed by the CPU 201 in accordance with a program stored in the ROM 202 or the hard disk 203 of the multifunction apparatus 102.

First, in Step S1401, when the hot folder processing is requested, the box information regarding the box in question is acquired from the box information management table 300, which has a format such as is shown in FIG. 3.

In Step S1402, the user information of the user that is logged in is acquired from the user information management table 400, which has a format such as is shown in FIG. 4. Because the identifier of the logged-in user is stored in a predetermined area within the memory, it can be acquired by accessing that area.

Next, process execution information for the box for which the hot folder process is being requested is acquired from the user information acquired in Step S1402 (Step S1403). For example, if the logged-in user is "user C" as shown in FIG. 4 and the box for which a process has been requested to be executed is "box 02" as shown in FIG. 3, the process execution information 401 acquired in Step S1403 is "TRUE". Similarly, if the user is "user D" and the box is "box 04", the process execution information 402 acquired in Step S1403 is "FALSE". The process execution information serves as an execution record for a box using a function defined for a certain box by a certain user, and can thus alternatively be referred to as "usage history".

In Step S1404, it is determined, based on the process execution information acquired in Step S1403, whether or not a hot folder process execution record exists for the logged-in user. If in Step S1404 it is determined that such an execution record exists, the procedure moves to Step S1407.

Figure 13:
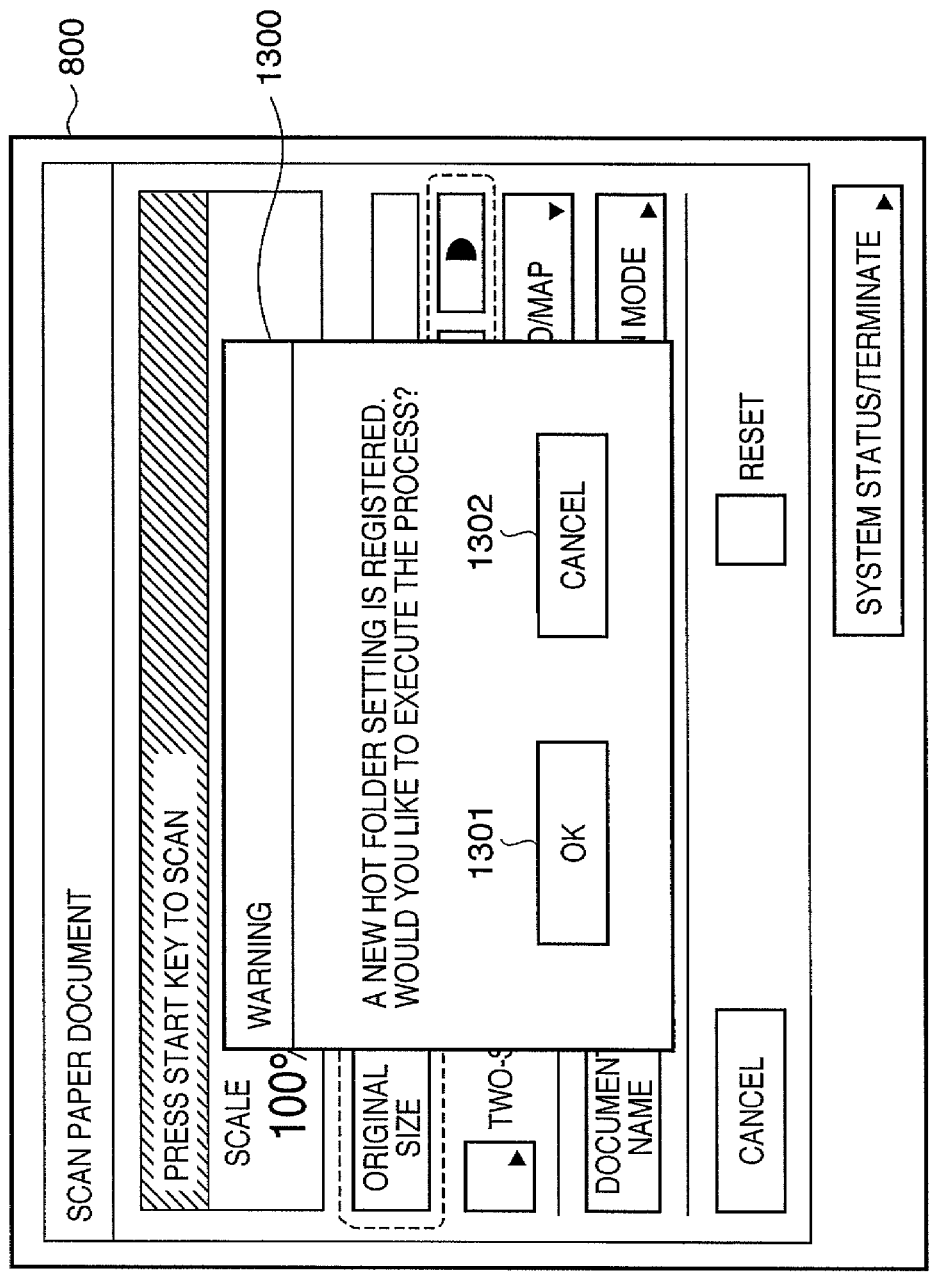
FIG. 13 is a diagram illustrating an example of a message display screen displayed in the display unit 206.

However, if in Step S1404 it is determined that such an execution record does not exist, or in other words, if the process execution information acquired in Step S1403 is "FALSE", a message display screen 1300, as shown in FIG. 13, is displayed in the display unit 206 (Step S1405). The user can request the execution of a process by pressing an "OK" key 1301 in the message display screen 1300 shown in FIG. 13. Alternatively, the user can stop the execution of the process by pressing a "Cancel" key 1302.

In Step S1406, the user's input made through the message display screen 1300 shown in FIG. 13 is received, and it is determined whether the process has been requested to be executed, or has been requested to be stopped. The procedure ends if it is determined that the process has been requested to be stopped, whereas the procedure moves to Step S1407 if it is determined that the process has been requested to be executed.

In Step S1407, the registered process parameter is acquired from the box information management table 300 acquired in Step S1401. Furthermore, in Step S1408, the process attributes, used for performing settings when the process indicated by the process parameter acquired in Step S1407 is executed, are acquired.

In Step S1409, it is determined whether or not the process parameter acquired in Step S1407 indicates that a document is to be deleted; the procedure moves to Step S1414 if the process parameter indicates that a document is to be deleted. If in Step S1409 it is determined that the process parameter does not indicate that a document is to be deleted, it is determined in Step S1410 whether or not that process is the final process registered in the box information acquired in Step S1401. If in Step S1410 it is determined that the process is not the final process, the process attributes acquired in Step S1408 are set, and the process acquired in Step S1407 is executed (Step S1411). After that, the next process parameter is acquired (Step S1407).

However, if in Step S1410 it is determined that the process is the final process, the process acquired in Step S1407 is executed using the process attributes acquired in Step S1408 (Step S1412), after which the procedure moves to Step S1414. Of course, a specific value, such as the document's filename, is acquired as the process attributes.

In Step S1414, the hot folder process execution information corresponding to the logged-in user is updated in the user information management table 400, after which the procedure ends. In other words, "TRUE" is stored in the execution information of the box for which the hot folder process has been executed. For example, if the process that "user C" registered for "box 3", as shown in FIG. 4, is executed, the execution information 401 corresponding to user C and box 3 is not updated, and remains "TRUE". However, if the process that "user D" registered for "box 4", as shown in FIG. 4, is executed, the execution information 402 corresponding to user D and box 4 is changed to "TRUE".

Figure 15:
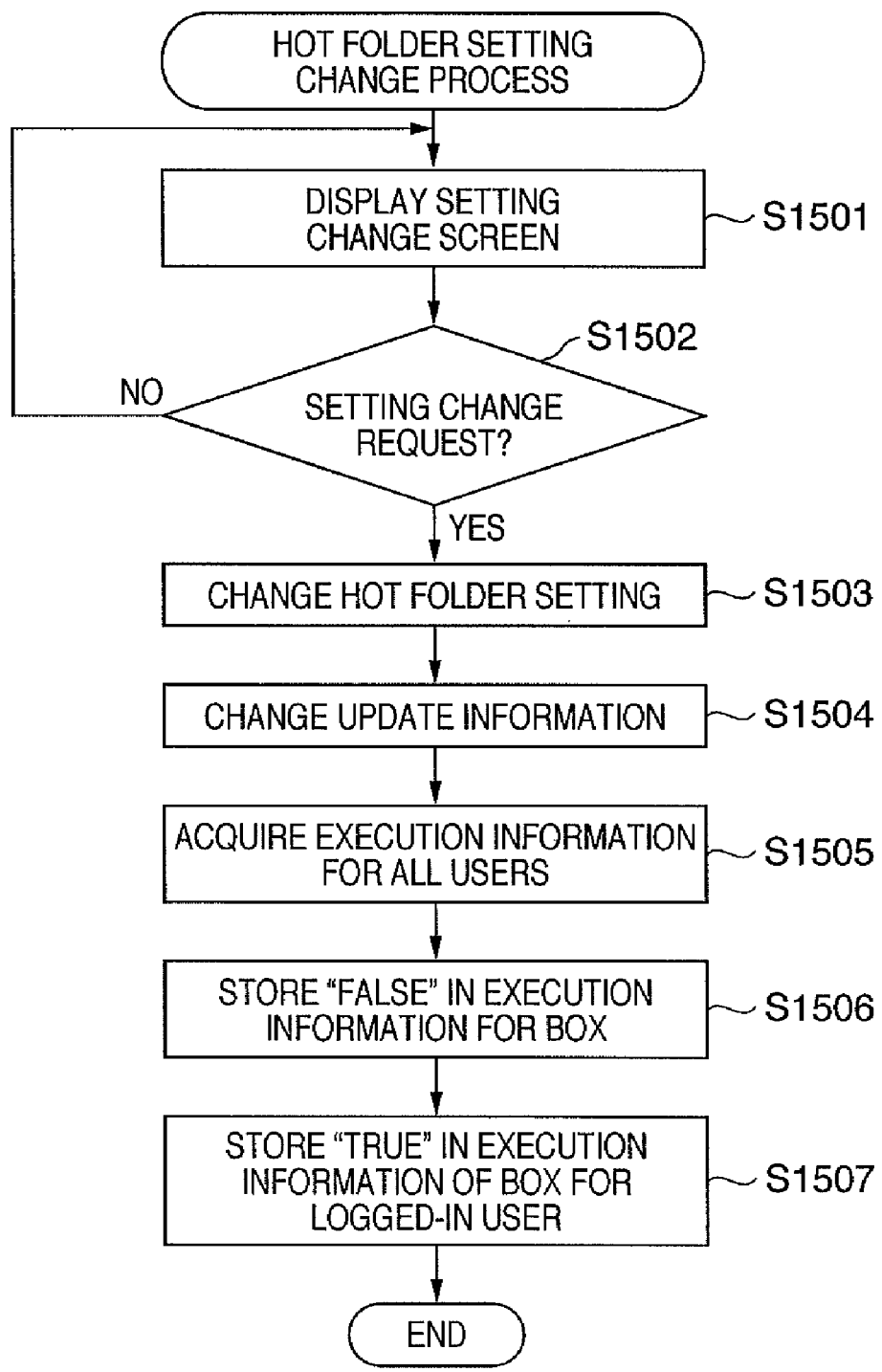
FIG. 15 is a flowchart illustrating an example of a setting change processing procedure in a box in which hot folders have been implemented according to an embodiment of the present invention.

FIG. 15 is a flowchart illustrating an example of a setting change procedure for the box information management table 300, according to the second embodiment of the present invention; S1501 to S1507 indicate each step of this procedure. This process is executed by the CPU 201 in accordance with a program stored in the ROM 202 or the hard disk 203 of the multifunction apparatus 102.

First, a setting change screen (not shown) is displayed upon a hot folder setting change being requested (Step S1501). Here, the box for which settings are to be changed can be selected, the process parameter to be changed can be set, and so on.

In Step S1502, it is determined whether or not a setting change has been requested, in if it is determined that a setting change has not been requested, the setting change screen is displayed. However, if in Step S1502 it is determined that a setting change has been requested, the box attributes corresponding to the specified box, held within the box information management table 300 shown in FIG. 3, are updated, and the hot folder settings are changed (Step S1503).

Furthermore, in Step S1504, the update information of the specified box is updated to the current date/time (that is, the execution time of Step S1504) in the box information management table 300.

Next, in Step S1505, the hot folder process execution information for all users is acquired from the user information management table 400 shown in FIG. 4.

In Step S1506, "FALSE" is stored as the execution information for the box on which setting changes were made, from among the hot folder process execution information for all users. Furthermore, "TRUE" is stored as the execution information for the box on which settings have been changed (Step S1507), the box being that which the user (logged-in user) requested settings to be changed for; after this, the procedure ends. For example, if the process attributes for "box 1" shown in FIG. 3 have been changed by "user C" shown in FIG. 4, the execution information 403 of "box 1" for all users is changed to "FALSE", after which only the execution information 404 for "user C" is changed to "TRUE".

Through this, when a hot folder process such as that illustrated in FIG. 14 is executed by a user different from the user that changed the settings, it is determined that there is no process execution record. Through the abovementioned method, it is possible, when a user stores a document in a box in which a hot folder has been implemented, to detect a change in the process parameter by referring to the hot folder process execution information of that user; thus it is possible to prevent the execution of processing that the user does not intend to be executed.

First Variation on the Second Embodiment

The second embodiment illustrates a method for detecting a change in a process parameter from information that indicates the presence or absence of a process execution record stored in hot folder process execution information in a user information management table. However, a change in the process parameter may instead be detected by storing the time of the latest execution performed by the user in the stated hot folder process execution information, as shown in FIG. 13, and comparing this to the time stored in the update information of the box information management table.

Second Variation on the Second Embodiment

In the second embodiment, and in the second variation thereof, a change in the process parameter was detected using hot folder process execution information in a user information management table. However, if an operational log has been stored for the boxes of each user, a change in the process parameter may instead be detected by acquiring the time of the latest execution performed by the user and comparing that with the time stored in the update information of the box management table.

Third Variation on the Second Embodiment

The second embodiment illustrates a method for detecting a change in a process parameter based on information that indicates the presence or absence of a user's process execution record, whereas the first and second variations thereon illustrate a method for detection a change in a process parameter by comparing the time of the latest execution performed by a user with the time stored in update information in a box management table. However, instead of this, if the version of the hot folder settings is being managed, the version information of the hot folder settings that have been used is stored in the process execution information for the user (FIGS. 18 and 19). A change in the process parameter may therefore be detected by comparing the version of the hot folder settings with the version stored in the user information management table.

Fourth Variation on the Second Embodiment

The second embodiment and the variations thereon describe methods in which a user is allowed to select whether or not s/he wishes to cancel execution if a change has been detected in the hot folder process parameter set for the box. However, the process may instead be cancelled without such a selection if a change in the process parameter has been detected.

Fifth Variation on the Second Embodiment

The second embodiment and the variations thereon describe methods for registering a hot folder process parameter in box attributes, as shown in FIG. 3. However, the process parameter may be stored as a defined file according to a predefined format, and the storage location and file name of the defined file may be stored in the box attributes in the box information management table, as shown in FIG. 20.

Sixth Variation on the Second Embodiment

The second embodiment and the abovementioned variations thereon describe methods for executing a hot folder process by storing image data generated by the reader device 211 in a box. However, the hot folder process may instead be executed by storing the image data in the box using drivers installed in a client computer connected via a network.

Other Variations

While various methods can be considered for detecting whether or not hot folder settings are in place, for example, a general setting file may exist, whereby settings may be denoted as "on" or "off" per box within the setting file. Furthermore, a setting file may exist for each box, whereby the settings are considered "on" if the setting file itself is present, and the settings are considered "off" if the setting file is not present.

Note that the present invention may be applied in a system configured of a plurality of devices (for example, a host computer, an interface device, a reader, a printer, and so on), or may be applied in an apparatus configured of a single device (for example, a copy machine, a facsimile device, and so on). In addition, the object of the present invention can also be achieved by supplying a system or an apparatus with a storage medium in which program code that realizes the functionality of the aforementioned embodiment is stored, and a computer of the system or apparatus reading out and executing the program code stored in the storage medium. In this case, the program code read out from the storage medium realizes the functionality of the aforementioned embodiment, and the present invention is configured of the program code and the storage medium in which the program code is stored.

In addition, the case where an operating system (OS) running in a computer performs part or all of the actual processing based on the program code, and the functionality of the aforementioned embodiment is realized by that processing, is included in the scope of the present invention. Furthermore, the present invention can also be applied in the case where the program code read out from the storage medium is written into a memory provided in a function expansion card installed in the computer or a function expansion unit connected to the computer. In such a case, a CPU or the like provided in the functionality expansion card or the functionality expansion unit performs part or all of the actual processing based on the program code, and the functionality of the aforementioned embodiment is realized by that processing.

A further embodiment of the present invention provides an image processing apparatus provided with a hot folder function that associates a box that accepts data with a process to be performed on data inputted into the box, the apparatus comprising:

a storage for storing a box management table that stores definitions of processes for data inputted into the box, and a user management table in which usage histories of boxes are registered and stored per user and per box;

processing means that, in the case where data has been inputted into the box by a user, refers to the user management table and determines whether or not there is a record of the user inputting data into the box, executes the process associated with the box on the inputted data if there is a record, or outputs a message indicating there is no record if there is no record and accepts a confirmatory input, and executes the process associated with the box on the inputted data and records a usage history of the box as used by the user in the user management table in the case where the confirmatory input has been accepted from the user; and process parameter maintenance means that deletes the usage history of the box from the user management table in the case where the process defined in the box management table has been changed in response to an operation performed by the user.

A further embodiment of the present invention provides a digital multifunction apparatus provided with a hot folder function that associates a box that accepts data with a process to be performed on data inputted into the box, the apparatus comprising:

an image scanner;

a storage for storing a box management table that stores definitions of processes for data inputted into the box; and processing means that, in the case where image data scanned by the scanner has been inputted into the box, refers to the box management table and executes the process associated with the box.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-012960, filed Jan. 23, 2007, which is hereby incorporated by reference herein in its entirety.

What is claimed is:

1. An image processing apparatus provided with a hot folder function that associates a box that accepts data with a process to be performed on data inputted into the box, the apparatus comprising:

a storage for storing a box management table that stores definitions of processes for data inputted into the box, and a user management table in which usage histories of boxes are registered and stored per user and per box;

processing unit that, in the case where data has been inputted into the box by a user, refers to the user management table and determines whether or not there is a record of the user inputting data into the box, executes the process associated with the box on the inputted data if there is a record, or outputs a message indicating there is no record if there is no record and accepts a confirmatory input, and executes the process associated with the box on the inputted data and records a usage history of the box as used by the user in the user management table in the case where the confirmatory input has been accepted from the user; and process parameter maintenance unit that deletes the usage history of the box from the user management table in the case where the process defined in the box management table has been changed in response to an operation performed by the user.

2. The image processing apparatus according to claim 1, further comprising:

an image scanner, wherein image data scanned by the scanner can be inputted into the box.

3. The image processing apparatus according to claim 1, further comprising:

a printer, wherein a print process performed by the printer is definable as one of the processes defined in the box management table.

4. The image processing apparatus according to claim 3, wherein a process combining an editing process, a deletion process, and a printing process for the data is definable as one of the processes defined in the box management table.

5. A control method for controlling an image processing apparatus having a storage and a processor, and provided with a hot folder function that associates a box that accepts data with a process to be performed on data inputted into the box, the method comprising the steps of:

determining, in the case where data has been inputted into a box by a user, whether or not there is a record of the user inputting data into the box, by referring to a user management table, stored in the storage, in which usage histories of boxes are registered and stored per user and per box;

outputting a message indicating there is no record if there is no record, and accepting a confirmatory input from the user;

executing the process associated with the box on the inputted data and registering the usage history of the box by the user in the user management table, by referring to the box management table, stored in the storage, that stores definitions of processes to be performed on data inputted into the box;

referring to the box management table in the case where there is a record and performing the process associated with the box on the inputted data; and deleting the usage history of the box from the user management table in the case where the process defined in the box management table has been changed in response to an operation performed by the user.

6. A non-transitory computer-readable storage medium in which is stored a program for causing a computer to execute the method according to claim 5.

* * * * *